United States Patent
Yu et al.

(10) Patent No.: US 11,006,385 B2
(45) Date of Patent: May 11, 2021

(54) PAGING OPTIMIZATION METHOD, APPARATUS, AND SYSTEM

(71) Applicant: HUAWEI TECHNOLOGIES CO., LTD., Guangdong (CN)

(72) Inventors: Zheng Yu, Beijing (CN); Fang Nan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/188,259

(22) Filed: Nov. 12, 2018

(65) Prior Publication Data
US 2019/0082420 A1    Mar. 14, 2019

Related U.S. Application Data

(63) Continuation of application No. 14/833,846, filed on Aug. 24, 2015, now Pat. No. 10,136,410, which is a
(Continued)

(51) Int. Cl.
*H04W 68/02* (2009.01)
*H04W 68/06* (2009.01)
(Continued)

(52) U.S. Cl.
CPC .......... *H04W 68/02* (2013.01); *H04B 7/0408* (2013.01); *H04B 7/0413* (2013.01);
(Continued)

(58) Field of Classification Search
CPC ... H04W 68/00; H04W 68/02; H04W 68/025; H04W 48/12; H04W 52/0216;
(Continued)

(56) References Cited

U.S. PATENT DOCUMENTS 5,826,173 A    10/1998 Dent
6,614,810 B1    9/2003 Lee et al.
(Continued)

FOREIGN PATENT DOCUMENTS

CN    1326626 A    12/2001
CN    101637059 A    1/2010
(Continued)

OTHER PUBLICATIONS

3GPP TS 23.401 V11.4.0 (Dec. 2012),3rd Generation Partnership Project;Technical Specification Group Services and System Aspects;General Packet Radio Service (GPRS) enhancements for Evolved Universal Terrestrial Radio Access Network (E-UTRAN) access(Release 11),total 284 pages.
(Continued)

*Primary Examiner* — Fred A Casca
(74) *Attorney, Agent, or Firm* — Gregg L. Jansen

(57) ABSTRACT

Embodiments of the present invention, relating to the communications field, disclose a paging optimization method, apparatus, and system, so as to ensure that a terminal normally receives a paging message sent by a system. A specific solution carried by a core network node comprising determining channel loss information of a terminal according to an international mobile subscriber identity IMSI or a temporary mobile subscriber identity S-TMSI of the terminal; and sending a first paging message that carries the channel loss information to an access network node, wherein the first paging message is used to page the terminal. The present invention is used in a paging process.

20 Claims, 6 Drawing Sheets

Receive a first paging message sent by a core network node — 101 send control information with enhanced coverage and/or a second paging message with enhanced coverage to a terminal in response to the first paging message — 102

Related U.S. Application Data continuation of application No. PCT/CN2013/071953, filed on Feb. 27, 2013.

(51) Int. Cl.

| | |
|---|---|
| *H04W 68/12* | (2009.01) |
| *H04W 72/00* | (2009.01) |
| *H04B 7/0413* | (2017.01) |
| *H04B 7/0417* | (2017.01) |
| *H04B 7/06* | (2006.01) |
| *H04B 17/318* | (2015.01) |
| *H04B 7/0452* | (2017.01) |
| *H04B 10/112* | (2013.01) |
| *H04B 7/0408* | (2017.01) |
| *H04W 24/08* | (2009.01) |
| *H04W 16/18* | (2009.01) |
| *H04W 16/14* | (2009.01) |
| *H04W 72/04* | (2009.01) |
| *H04W 16/28* | (2009.01) |
| *H04W 16/22* | (2009.01) |
| *H04W 88/02* | (2009.01) |
| *G01S 5/00* | (2006.01) |
| *G01S 5/02* | (2010.01) |

(52) U.S. Cl.
CPC ......... *H04B 7/0417* (2013.01); *H04B 7/0452* (2013.01); *H04B 7/0617* (2013.01); *H04B 7/0619* (2013.01); *H04B 7/0634* (2013.01); *H04B 7/0695* (2013.01); *H04B 10/112* (2013.01); *H04B 17/318* (2015.01); *H04W 16/14* (2013.01); *H04W 16/18* (2013.01); *H04W 16/22* (2013.01); *H04W 16/28* (2013.01); *H04W 24/08* (2013.01); *H04W 68/025* (2013.01); *H04W 68/06* (2013.01); *H04W 68/12* (2013.01); *H04W 72/005* (2013.01); *H04W 72/042* (2013.01); *G01S 5/0036* (2013.01); *G01S 5/02* (2013.01); *H04W 88/02* (2013.01)

(58) Field of Classification Search
CPC ... H04W 76/048; H04W 4/005; H04W 24/08; H04W 16/18; H04W 16/14; H04W 72/042; H04W 16/28; H04W 16/22; H04W 72/005; H04W 68/06; H04W 68/12; H04W 88/02; H04L 1/0026; H04B 10/112; H04B 7/0408; H04B 7/0619; H04B 7/0413; H04B 7/0417; H04B 7/0695; H04B 17/318; H04B 7/0634; H04B 7/0452; H04B 7/0617; G01S 5/0036; G01S 5/02
USPC ... 455/458, 515, 434, 450, 67.11, 68, 127.5, 455/418; 370/329, 252
See application file for complete search history.

(56) References Cited

U.S. PATENT DOCUMENTS

| | | |
|---|---|---|
| 2003/0223388 A1 | 12/2003 | Agashe et al. |
| 2004/0204101 A1 | 10/2004 | Qiu et al. |
| 2005/0020292 A1 | 1/2005 | Kim |
| 2005/0141545 A1 | 6/2005 | Fein et al. |
| 2007/0207788 A1 | 9/2007 | Phan et al. |
| 2007/0254679 A1 | 11/2007 | Montojo et al. |
| 2008/0227449 A1 | 9/2008 | Gholmieh et al. |
| 2008/0253336 A1* | 10/2008 | Parkvall ............ H04W 72/0413 370/335 |
| 2010/0309803 A1* | 12/2010 | Toh ................ H04L 1/0006 370/252 |
| 2011/0090838 A1* | 4/2011 | Shaw ................ H04L 1/0036 370/313 |
| 2011/0117897 A1 | 5/2011 | Lee et al. |
| 2011/0222491 A1* | 9/2011 | Vajapeyam ......... H04L 1/0072 370/329 |
| 2012/0044910 A1 | 2/2012 | Maeda et al. |
| 2012/0064932 A1 | 3/2012 | Lim et al. |
| 2013/0058289 A1 | 3/2013 | Park et al. |
| 2013/0170438 A1* | 7/2013 | Nishida .............. H04W 68/005 370/328 |
| 2014/0105152 A1 | 4/2014 | Wu |
| 2014/0126359 A1* | 5/2014 | Sarkar ............. H04W 72/0486 370/230 |

FOREIGN PATENT DOCUMENTS

| | | |
|---|---|---|
| CN | 102202415 A | 9/2011 |
| CN | 102223715 A | 10/2011 |
| CN | 102378306 A | 3/2012 |
| CN | 102781094 A | 11/2012 |
| CN | 102884854 A | 1/2013 |
| EP | 2706791 A1 | 3/2014 |
| WO | 9831165 A2 | 7/1998 |
| WO | 0030289 A1 | 5/2000 |
| WO | 2005062487 A1 | 7/2005 |
| WO | 2010111194 A1 | 9/2010 |
| WO | 2012014342 A1 | 2/2012 |
| WO | 2012135275 A2 | 10/2012 |
| WO | 2012149683 A1 | 11/2012 |
| WO | 2013002566 A2 | 1/2013 |

OTHER PUBLICATIONS

3GPP TS 36.300 V11.4.0 (Dec. 2012),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 11),total 207 pages.

3GPP TS 36.304 V11.2.0 (Dec. 2012),3rd Generation Partnership Project;Technical Specification Group Radio Access Network;Evolved Universal Terrestrial Radio Access (E-UTRA); User Equipment (UE) procedures in idle mode (Release 11),total 33 pages.

3GPP TS 36.331 V11.2.0 (Dec. 2012),3rd Generation Partnership Project;Technical Specification Group Radio Access Network;Evolved Universal Terrestrial Radio Access (E-UTRA);Radio Resource Control (RRC);Protocol specification (Release 11),total 340 pages.

R1-130218 MediaTek Inc.,"On Required System Functionalities for MTC UEs Operating in Enhanced Coverage Mode",3GPP TSG RAN WG1 Meeting #72,St Julian's, Malta, Jan. 28-Feb. 1, 2013,total 6 pages.

3GPP TS 36.413 V11.2.1 (Feb. 2013);3rd Generation Partnership Project;Technical Specification Group Radio Access Network;Evolved Universal Terrestrial Radio Access Network(E-UTRAN);S1 Application Protocol (S1AP)(Release 11), total 272 pages.

3GPP TS 36.213 V11.1.0 (Dec. 2012);3rd Generation Partnership Project;Technical Specification Group Radio Access Network;Evolved Universal Terrestrial Radio Access (E-UTRA);Physical layer procedures(Release 11),total 160 pages.

3GPP TS 36.211 V11.1.0 (Dec. 2012);3rd Generation Partnership Project;Technical Specification Group Radio Access Network;Evolved Universal Terrestrial Radio Access (E-UTRA);Physical Channels and Modulation(Release 11),total 108 pages.

3GPP TS 36.321 V11.1.0 (Dec. 2012);3rd Generation Partnership Project;Technical Specification Group Radio Access Network;Evolved Universal Terrestrial Radio Access (E-UTRA);Medium Access Control (MAC) protocol specification (Release 11),total 57 pages.

\* cited by examiner

PAGING OPTIMIZATION METHOD, APPARATUS, AND SYSTEM

CROSS-REFERENCE TO RELATED APPLICATIONS

This application is a continuation of U.S. patent application Ser. No. 14/833,846, filed on Aug. 24, 2015, which is a continuation of International Application No. PCT/CN2013/071953, filed on Feb. 27, 2013. All of the afore-mentioned patent applications are hereby incorporated by reference in their entireties.

TECHNICAL FIELD

The present invention relates to the communications field, and in particular, to a paging optimization method, apparatus, and system.

BACKGROUND

As communications technologies develop, the Internet of Things has been widely used in multiple fields such as smart grid, intelligent transportation, government affairs, and smart household. Currently, low-cost machine type communications user equipment (MTC UE) has been introduced to a Long Term Evolution (LTE) network, with a view to enhancing or optimizing the LTE network and an air interface for the MTC UE. An important application of the MTC UE is a smart meter, which, for example, can be used to automatically read metering information such as water, electricity, and gas, and report the metering information to a data center. However, such a smart meter is generally installed in a basement of a house, or is isolated by a heavy metal housing. Therefore, in this case, a path loss between the MTC UE and an evolved NodeB (eNodeB) is more severe than a path loss between a common UE and the eNodeB. To ensure that the MTC UE can still normally communicate with the eNodeB when the path loss between the MTC UE and the eNodeB is severe, an operator proposes enhancing coverage by 20 dB compared with an existing LTE network when an LTE network is providing a service for the MTC UE.

In the existing LTE network, for a UE in an idle state, when the UE has an incoming service, or for a UE in an idle state or a connected state, when a system message needs to be changed or an earthquake or tsunami early warning or commercial mobile alert service is required, the network needs to page a corresponding UE. A paging process is usually as follows: A mobility management entity (MME) that serves a UE sends a paging message to all eNodeBs in a tracking area; when receiving the paging message sent by the MME, an eNodeB delivers the paging message to a UE in a management range of the eNodeB.

During implementation of the foregoing paging process, if the existing LTE system is used to provide a service for a UE that has a relatively severe path loss with an eNodeB, for example, an MTC UE, coverage of the existing LTE system needs to be enhanced. In this case, a paging message with enhanced coverage needs to be sent to the UE. If the UE is being paged still in an existing paging manner, the UE cannot normally receive a paging message of the system, which causes a paging failure.

SUMMARY

Embodiments of the present invention provide a paging optimization method, apparatus, and system, so as to ensure that a terminal normally receives a paging message sent by a system.

To achieve the foregoing objective, the following technical solutions are used in the embodiments of the present invention:

A first aspect of the present invention provides a paging optimization method, including:

receiving a first paging message sent by a core network node, where the first paging message is used to page a terminal; and sending control information with enhanced coverage and/or a second paging message with enhanced coverage to the terminal in response to the first paging message;

With reference to the first aspect, in a possible implementation manner, the first paging message includes channel loss information of the terminal; or before the sending control information with enhanced coverage and/or a second paging message with enhanced coverage to the terminal in response to the first paging message, the method further includes:

receiving channel loss information of the terminal sent by the core network node.

With reference to the first aspect and the foregoing possible implementation manner, in another possible implementation manner, before the receiving a first paging message sent by a core network node, the method further includes:

receiving channel loss information sent by the terminal; and sending the channel loss information of the terminal to the core network node.

With reference to the first aspect and the foregoing possible implementation manner, in another possible implementation manner, the method further includes:

receiving an international mobile subscriber identity IMSI or a temporary mobile subscriber identity S-TMSI that is sent by the terminal, and receiving channel loss information sent by the terminal; or, receiving an IMSI or an S-TMSI of the terminal sent by the core network node, and receiving channel loss information of the terminal sent by the core network node; or, receiving channel loss information sent by the terminal and an S-TMSI of the terminal sent by the core network node; and storing the IMSI or the S-TMSI of the terminal associatively with the channel loss information of the terminal.

With reference to the first aspect and the foregoing possible implementation manner, in another possible implementation manner, before the sending control information with enhanced coverage and/or a second paging message with enhanced coverage to the terminal in response to the first paging message, the method further includes:

determining, according to an IMSI or an S-TMSI of the terminal, that the channel loss information of the terminal is stored.

With reference to the first aspect and the foregoing possible implementation manner, in another possible implementation manner, the sending control information with enhanced coverage and/or a second paging message with enhanced coverage to the terminal in response to the first paging message includes:

determining a transmission parameter according to the channel loss information of the terminal; and sending the control information with enhanced coverage and/or the second paging message with enhanced coverage to the terminal according to the transmission parameter.

With reference to the first aspect and the foregoing possible implementation manner, in another possible implementation manner, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

With reference to the first aspect and the foregoing possible implementation manner, in another possible implementation manner, the transmission parameter includes at least one of the following: a start frame number, a start subframe number, a start timeslot number, a start symbol number, a number of the first resource block RB, a number of the first subcarrier, a quantity of frames, a quantity of subframes, a quantity of timeslots, a quantity of symbols, a quantity of RBs, a quantity of subcarriers, a quantity of repeated times, a spreading factor, a spread spectrum sequence index, a size of transmission time interval bundling TTI bundling, an aggregation level, power configuration, a modulation and coding scheme, a cycle, a paging frame PF, and a paging occasion PO that are used for transmission of the control information with enhanced coverage and/or the second paging message with enhanced coverage.

With reference to the first aspect and the foregoing possible implementation manner, in another possible implementation manner, the channel loss information includes a value of a channel loss, or a range of a value of a channel loss, or a range index of a value of a channel loss.

With reference to the first aspect and the foregoing possible implementation manner, in another possible implementation manner, the channel loss includes at least one of the following: reference signal received power RSRP, reference signal received quality RSRQ, a path loss, and a channel quality indication CQI.

A second aspect of the present invention provides a paging optimization method, including:

determining, according to an international mobile subscriber identity IMSI or a temporary mobile subscriber identity S-TMSI of a terminal, that channel loss information of the terminal is stored; and sending a first paging message that carries the channel loss information to an access network node, so that the access network node sends control information with enhanced coverage and/or a second paging message with enhanced coverage to the terminal according to the first paging message; or, sending a first paging message and the channel loss information of the terminal to the access network node, so that the access network node sends control information with enhanced coverage and/or a second paging message with enhanced coverage to the terminal according to the first paging message and the channel loss information of the terminal.

With reference to the second aspect, in a possible implementation manner, the method further includes:

sending the IMSI or the S-TMSI of the terminal to the access network node, and sending the channel loss information of the terminal to the access network node, so that the access network device stores the IMSI or the S-TMSI of the terminal associatively with the channel loss information of the terminal.

With reference to the second aspect and the foregoing possible implementation manner, in another possible implementation manner, before the determining, according to an international mobile subscriber identity IMSI or a temporary mobile subscriber identity S-TMSI of a terminal, that channel loss information of the terminal is stored, the method further includes:

receiving the channel loss information of the terminal; and storing the channel loss information of the terminal associatively with the IMSI or the S-TMSI of the terminal.

With reference to the second aspect and the foregoing possible implementation manner, in another possible implementation manner, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

With reference to the second aspect and the foregoing possible implementation manner, in another possible implementation manner, the channel loss information includes a value of a channel loss, or a range of a value of a channel loss, or a range index of a value of a channel loss.

With reference to the second aspect and the foregoing possible implementation manner, in another possible implementation manner, the channel loss includes at least one of the following: reference signal received power RSRP, reference signal received quality RSRQ, a path loss, and a channel quality indication CQI.

A third aspect of the present invention provides a paging optimization method, including:

determining channel loss information between a terminal and an access network node;

sending the channel loss information to the access network node, sending an international mobile subscriber identity IMSI or a temporary mobile subscriber identity S-TMSI to the access network node, and determining a transmission parameter according to the channel loss information; and receiving, according to the transmission parameter, control information with enhanced coverage and/or a second paging message with enhanced coverage that are/is sent by the access network node.

With reference to the third aspect, in a possible implementation manner, before the sending the channel loss information to the access network node, sending an international mobile subscriber identity IMSI or a temporary mobile subscriber identity S-TMSI to the access network node, and determining a transmission parameter according to the channel loss information, the method further includes:

determining that the channel loss information meets a set condition, where the set condition includes that a value of the channel loss is greater than or equal to a set threshold.

With reference to the third aspect and the foregoing possible implementation manner, in another possible implementation manner, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

With reference to the third aspect and the foregoing possible implementation manner, in another possible implementation manner, the transmission parameter includes at least one of the following: a start frame number, a start subframe number, a start timeslot number, a start symbol number, a number of the first resource block RB, a number of the first subcarrier, a quantity of frames, a quantity of subframes, a quantity of timeslots, a quantity of symbols, a quantity of RBs, a quantity of subcarriers, a quantity of repeated times, a spreading factor, a spread spectrum sequence index, a size of transmission time interval bundling TTI bundling, an aggregation level, power configuration, a modulation and coding scheme, a cycle, a paging frame PF, and a paging occasion PO that are used for transmission of the control information with enhanced coverage and/or the second paging message with enhanced coverage.

With reference to the third aspect and the foregoing possible implementation manner, in another possible implementation manner, the channel loss information includes the value of the channel loss, or a range of the value of the channel loss, or a range index of the value of the channel loss.

With reference to the third aspect and the foregoing possible implementation manner, in another possible implementation manner, the channel loss includes at least one of the following: reference signal received power RSRP, reference signal received quality RSRQ, a path loss, and a channel quality indication CQI.

A fourth aspect of the present invention provides an access network node, including:

a first receiving unit, configured to receive a first paging message sent by a core network node, where the first paging message is used to page a terminal; and a first sending unit, configured to send control information with enhanced coverage and/or a second paging message with enhanced coverage to the terminal in response to the first paging message.

With reference to the fourth aspect, in a possible implementation manner, the first paging message includes channel loss information of the terminal; or the access network node further includes:

a second receiving unit, configured to, before the first sending unit sends control information with enhanced coverage and/or a second paging message with enhanced coverage to the terminal in response to the first paging message, receive channel loss information of the terminal sent by the core network node.

With reference to the fourth aspect and the foregoing possible implementation manner, in another possible implementation manner, the access network node further includes:

a third receiving unit, configured to, before the first receiving unit receives the first paging message sent by the core network node, receive channel loss information sent by the terminal; and a second sending unit, configured to send the channel loss information of the terminal received by the third receiving unit to the core network node.

With reference to the fourth aspect and the foregoing possible implementation manner, in another possible implementation manner, the access network node further includes:

a fourth receiving unit, configured to receive an international mobile subscriber identity IMSI or a temporary mobile subscriber identity S-TMSI that is sent by the terminal, and receive channel loss information sent by the terminal; or, receive an IMSI or an S-TMSI of the terminal sent by the core network node, and receive channel loss information of the terminal sent by the core network node; or, receive channel loss information sent by the terminal and an S-TMSI of the terminal sent by the core network node; and a storage unit, configured to store, associatively with the channel loss information of the terminal, the IMSI or the S-TMSI of the terminal received by the fourth receiving unit.

With reference to the fourth aspect and the foregoing possible implementation manner, in another possible implementation manner, the access network node further includes:

a determining unit, configured to, before the first sending unit sends control information with enhanced coverage and/or a second paging message with enhanced coverage to the terminal in response to the first paging message, determine, according to an IMSI or an S-TMSI of the terminal, that the channel loss information of the terminal is stored.

With reference to the fourth aspect and the foregoing possible implementation manner, in another possible implementation manner, the first sending unit includes:

a determining module, configured to determine a transmission parameter according to the channel loss information of the terminal; and a sending module, configured to send the control information with enhanced coverage and/or the second paging message with enhanced coverage to the terminal according to the transmission parameter determined by the determining module.

With reference to the fourth aspect and the foregoing possible implementation manner, in another possible implementation manner, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

With reference to the fourth aspect and the foregoing possible implementation manner, in another possible implementation manner, the transmission parameter includes at least one of the following: a start frame number, a start subframe number, a start timeslot number, a start symbol number, a number of the first resource block RB, a number of the first subcarrier, a quantity of frames, a quantity of subframes, a quantity of timeslots, a quantity of symbols, a quantity of RBs, a quantity of subcarriers, a quantity of repeated times, a spreading factor, a spread spectrum sequence index, a size of transmission time interval bundling TTI bundling, an aggregation level, power configuration, a modulation and coding scheme, a cycle, a paging frame PF, and a paging occasion PO that are used for transmission of the control information with enhanced coverage and/or the second paging message with enhanced coverage.

With reference to the fourth aspect and the foregoing possible implementation manner, in another possible implementation manner, the channel loss information includes a value of a channel loss, or a range of a value of a channel loss, or a range index of a value of a channel loss.

With reference to the fourth aspect and the foregoing possible implementation manner, in another possible implementation manner, the channel loss includes at least one of the following: reference signal received power RSRP, reference signal received quality RSRQ, a path loss, and a channel quality indication CQI.

A fifth aspect of the present invention provides a core network node, including:

a determining unit, configured to determine, according to an international mobile subscriber identity IMSI or a temporary mobile subscriber identity S-TMSI of a terminal, that channel loss information of the terminal is stored; and a first sending unit, configured to send a first paging message that carries the channel loss information to an access network node, so that the access network node sends control information with enhanced coverage and/or a second paging message with enhanced coverage to the terminal according to the first paging message; or, a second sending unit, configured to send a first paging message and the channel loss information of the terminal to the access network node, so that the access network node sends control information with enhanced coverage and/or a second paging message with enhanced coverage to the terminal according to the first paging message and the channel loss information of the terminal.

With reference to the fifth aspect, in a possible implementation manner, the core network node further includes:

a third sending unit, configured to send the IMSI or the S-TMSI of the terminal to the access network node, and send the channel loss information of the terminal to the access network node, so that the access network device stores the IMSI or the S-TMSI of the terminal associatively with the channel loss information of the terminal.

With reference to the fifth aspect and the foregoing possible implementation manner, in another possible implementation manner, the core network node further includes:

a receiving unit, configured to receive the channel loss information of the terminal before the determining unit determines, according to the international mobile subscriber identity IMSI or the temporary mobile subscriber identity S-TMSI of the terminal, that the channel loss information of the terminal is stored; and a storage unit, configured to store, associatively with the IMSI or the S-TMSI of the terminal, the channel loss information of the terminal received by the receiving unit.

With reference to the fifth aspect and the foregoing possible implementation manner, in another possible implementation manner, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

With reference to the fifth aspect and the foregoing possible implementation manner, in another possible implementation manner, the channel loss information includes a value of a channel loss, or a range of a value of a channel loss, or a range index of a value of a channel loss.

With reference to the fifth aspect and the foregoing possible implementation manner, in another possible implementation manner, the channel loss includes at least one of the following: reference signal received power RSRP, reference signal received quality RSRQ, a path loss, and a channel quality indication CQI.

A sixth aspect of the present invention provides a terminal, including:

a first determining unit, configured to determine channel loss information between the terminal and an access network node;

a sending and determining unit, configured to send the channel loss information to the access network node, send an international mobile subscriber identity IMSI or a temporary mobile subscriber identity S-TMSI to the access network node, and determine a transmission parameter according to the channel loss information; and a receiving unit, configured to receive, according to the transmission parameter determined by the sending and determining unit, control information with enhanced coverage and/or a second paging message with enhanced coverage that are/is sent by the access network node.

With reference to the sixth aspect, in a possible implementation manner, the terminal further includes:

a second determining unit, configured to, before the sending and determining unit sends the channel loss information to the access network node, sends the international mobile subscriber identity IMSI or the temporary mobile subscriber identity S-TMSI to the access network node, and determines the transmission parameter according to the channel loss information, determine that the channel loss information meets a set condition, where the set condition includes that a value of the channel loss is greater than or equal to a set threshold.

With reference to the sixth aspect and the foregoing possible implementation manner, in another possible implementation manner, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

With reference to the sixth aspect and the foregoing possible implementation manner, in another possible implementation manner, the transmission parameter includes at least one of the following: a start frame number, a start subframe number, a start timeslot number, a start symbol number, a number of the first resource block RB, a number of the first subcarrier, a quantity of frames, a quantity of subframes, a quantity of timeslots, a quantity of symbols, a quantity of RBs, a quantity of subcarriers, a quantity of repeated times, a spreading factor, a spread spectrum sequence index, a size of transmission time interval bundling TTI bundling, an aggregation level, power configuration, a modulation and coding scheme, a cycle, a paging frame PF, and a paging occasion PO that are used for transmission of the control information with enhanced coverage and/or the second paging message with enhanced coverage.

With reference to the sixth aspect and the foregoing possible implementation manner, in another possible implementation manner, the channel loss information includes the value of the channel loss, or a range of the value of the channel loss, or a range index of the value of the channel loss.

With reference to the sixth aspect and the foregoing possible implementation manner, in another possible implementation manner, the channel loss includes at least one of the following: reference signal received power RSRP, reference signal received quality RSRQ, a path loss, and a channel quality indication CQI.

A seventh aspect of the present invention provides an access network node, including: at least one processor, a receiver, and a transmitter, where:

the receiver is configured to receive a first paging message sent by a core network node, where the first paging message is used to page a terminal;

the processor is configured to process the first paging message received by the receiver, and trigger the transmitter to respond to the first paging message; and the transmitter is configured to send control information with enhanced coverage and/or a second paging message with enhanced coverage to the terminal in response to the first paging message.

With reference to the seventh aspect, in a first possible implementation manner, the first paging message includes channel loss information of the terminal; or the receiver is further configured to, before the transmitter sends control information with enhanced coverage and/or a second paging message with enhanced coverage to the terminal in response to the first paging message, receive channel loss information of the terminal sent by the core network node.

With reference to the seventh aspect and the foregoing possible implementation manner, in another possible implementation manner, the receiver is further configured to, before receiving the first paging message sent by the core network node, receive channel loss information sent by the terminal; and the transmitter is further configured to send the channel loss information of the terminal to the core network node.

With reference to the seventh aspect and the foregoing possible implementation manner, in another possible implementation manner, the access network node further includes a memory, where:

the receiver is further configured to receive an international mobile subscriber identity IMSI or a temporary mobile subscriber identity S-TMSI that is sent by the terminal, and receive channel loss information sent by the terminal; or, receive an IMSI or an S-TMSI of the terminal sent by the core network node, and receive channel loss information of the terminal sent by the core network node; or, receive channel loss information sent by the terminal and an S-TMSI of the terminal sent by the core network node; and the memory is configured to store the IMSI or the S-TMSI of the terminal associatively with the channel loss information of the terminal.

With reference to the seventh aspect and the foregoing possible implementation manner, in another possible implementation manner, the processor is further configured to, before processing the first paging message received by the receiver, and triggering the transmitter to respond to the first paging message, determine, according to an IMSI or an S-TMSI of the terminal, that the channel loss information of the terminal is stored.

With reference to the seventh aspect and the foregoing possible implementation manner, in another possible implementation manner, the processor is further configured to determine a transmission parameter according to the channel loss information of the terminal; and the transmitter is further configured to send the control information with enhanced coverage and/or the second paging message with enhanced coverage to the terminal according to the transmission parameter.

With reference to the seventh aspect and the foregoing possible implementation manner, in another possible implementation manner, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

With reference to the seventh aspect and the foregoing possible implementation manner, in another possible implementation manner, the transmission parameter includes at least one of the following: a start frame number, a start subframe number, a start timeslot number, a start symbol number, a number of the first resource block RB, a number of the first subcarrier, a quantity of frames, a quantity of subframes, a quantity of timeslots, a quantity of symbols, a quantity of RBs, a quantity of subcarriers, a quantity of repeated times, a spreading factor, a spread spectrum sequence index, a size of transmission time interval bundling TTI bundling, an aggregation level, power configuration, a modulation and coding scheme, a cycle, a paging frame PF, and a paging occasion PO that are used for transmission of the control information with enhanced coverage and/or the second paging message with enhanced coverage.

With reference to the seventh aspect and the foregoing possible implementation manner, in another possible implementation manner, the channel loss information includes a value of a channel loss, or a range of a value of a channel loss, or a range index of a value of a channel loss.

With reference to the seventh aspect and the foregoing possible implementation manner, in another possible implementation manner, the channel loss includes at least one of the following: reference signal received power RSRP, reference signal received quality RSRQ, a path loss, and a channel quality indication CQI.

An eighth aspect of the present invention provides a core network node, including: at least one processor and a transmitter, where:

the processor is configured to determine, according to an international mobile subscriber identity IMSI or a temporary mobile subscriber identity S-TMSI of a terminal, that channel loss information of the terminal is stored; and the transmitter is configured to send a first paging message that carries the channel loss information to an access network node, so that the access network node sends control information with enhanced coverage and/or a second paging message with enhanced coverage to the terminal according to the first paging message; or, the transmitter is further configured to send a first paging message and the channel loss information of the terminal to the access network node, so that the access network node sends control information with enhanced coverage and/or a second paging message with enhanced coverage to the terminal according to the first paging message and the channel loss information of the terminal.

With reference to the eighth aspect, in a possible implementation manner, the transmitter is further configured to send the IMSI or the S-TMSI of the terminal to the access network node, and send the channel loss information of the terminal to the access network node, so that the access network node stores the IMSI or the S-TMSI of the terminal associatively with the channel loss information of the terminal.

With reference to the eighth aspect and the foregoing possible implementation manner, in another possible implementation manner, the core network node further includes a receiver and a memory, where:

the receiver is configured to, before the determining, according to an international mobile subscriber identity IMSI or a temporary mobile subscriber identity S-TMSI of a terminal, that channel loss information of the terminal is stored, receive the channel loss information of the terminal; and the memory is configured to store the channel loss information of the terminal associatively with the IMSI or the S-TMSI of the terminal.

With reference to the eighth aspect and the foregoing possible implementation manner, in another possible implementation manner, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

With reference to the eighth aspect and the foregoing possible implementation manner, in another possible implementation manner, the channel loss information includes a value of a channel loss, or a range of a value of a channel loss, or a range index of a value of a channel loss.

With reference to the eighth aspect and the foregoing possible implementation manner, in another possible implementation manner, the channel loss includes at least one of the following: reference signal received power RSRP, reference signal received quality RSRQ, a path loss, and a channel quality indication CQI.

A ninth aspect of the present invention provides a terminal, including: at least one processor, a receiver, and a transmitter, where:

the processor is configured to determine channel loss information between the terminal and an access network node;

the processor is further configured to trigger the transmitter to: send the channel loss information to the access network node, and send an international mobile subscriber identity IMSI or a temporary mobile subscriber identity S-TMSI to the access network node; and is further configured to determine a transmission parameter according to the channel loss information; and the receiver is configured to receive, according to the transmission parameter, control information with enhanced coverage and/or a second paging message with enhanced coverage that are/is sent by the access network node.

With reference to the ninth aspect, in a possible implementation manner, the processor is further configured to, before the sending the channel loss information to the access network node, and sending an international mobile subscriber identity IMSI or a temporary mobile subscriber identity S-TMSI to the access network node, determine that the channel loss information meets a set condition, where the set condition includes that a value of the channel loss is greater than or equal to a set threshold.

With reference to the ninth aspect and the foregoing possible implementation manner, in another possible implementation manner, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

With reference to the ninth aspect and the foregoing possible implementation manner, in another possible implementation manner, the transmission parameter includes at least one of the following: a start frame number, a start subframe number, a start timeslot number, a start symbol number, a number of the first resource block RB, a number of the first subcarrier, a quantity of frames, a quantity of subframes, a quantity of timeslots, a quantity of symbols, a quantity of RBs, a quantity of subcarriers, a quantity of repeated times, a spreading factor, a spread spectrum sequence index, a size of transmission time interval bundling TTI bundling, an aggregation level, power configuration, a modulation and coding scheme, a cycle, a paging frame PF, and a paging occasion PO that are used for transmission of the control information with enhanced coverage and/or the second paging message with enhanced coverage.

With reference to the ninth aspect and the foregoing possible implementation manner, in another possible implementation manner, the channel loss information includes the value of the channel loss, or a range of the value of the channel loss, or a range index of the value of the channel loss.

With reference to the ninth aspect and the foregoing possible implementation manner, in another possible implementation manner, the channel loss includes at least one of the following: reference signal received power RSRP, reference signal received quality RSRQ, a path loss, and a channel quality indication CQI.

A tenth aspect of the present invention provides a paging optimization system, including: an access network node, a core network node, and a terminal, where:

the access network node is configured to receive a first paging message sent by the core network node, where the first paging message is used to page the terminal; and send control information with enhanced coverage and/or a second paging message with enhanced coverage to the terminal in response to the first paging message;

the core network node is configured to determine, according to an international mobile subscriber identity IMSI or a temporary mobile subscriber identity S-TMSI of the terminal, that channel loss information of the terminal is stored; and send the first paging message that carries the channel loss information to the access network node, so that the access network node sends the control information with enhanced coverage and/or the second paging message with enhanced coverage to the terminal according to the first paging message; or, send the first paging message and the channel loss information of the terminal to the access network node, so that the access network node sends the control information with enhanced coverage and/or the second paging message with enhanced coverage to the terminal according to the first paging message and the channel loss information of the terminal; and the terminal is configured to send the channel loss information to the access network node, and send the international mobile subscriber identity IMSI or the temporary mobile subscriber identity S-TMSI to the access network node; determine a transmission parameter according to the channel loss information; and receive, according to the transmission parameter, the control information with enhanced coverage and/or the second paging message with enhanced coverage that are/is sent by the access network node.

According to the paging optimization method, apparatus, and system provided in the embodiments of the present invention, when a terminal needs to be paged, a core network node sends a first paging message to an access network node; after receiving the first paging message sent by the core network node, the access network node sends control information with enhanced coverage and/or a second paging message with enhanced coverage to the terminal that needs to be paged. This effectively ensures that, in a case in which a channel loss between the terminal and the access network node is severe, the terminal can still normally receive a paging message sent by a system.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be noted that a paging optimization method provided in the embodiments of the present invention may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Universal Mobile Telecommunication System (UMTS), an LTE system, and other communications systems. For example, when the paging optimization method is applied to the UMTS system, the core network node in the embodiments of the present invention may be a serving GPRS support node (Serving GPRS SUPPORT NODE, SGSN), and the access network node may be a radio network controller (RNC), or the access network node may be another radio access network device; when the paging optimization method is applied to the LTE system, the core network node in the embodiments of the present invention may be an MME, and the access network node may be an eNodeB. For ease of understanding by a person skilled in the art, the LTE system is used as an example to describe the embodiments of the present invention.

It should be noted that, in the embodiments of the present invention, a terminal may be a common UE, or may be an MTC UE, which is not limited in the embodiments of the present invention.

Figure 1:
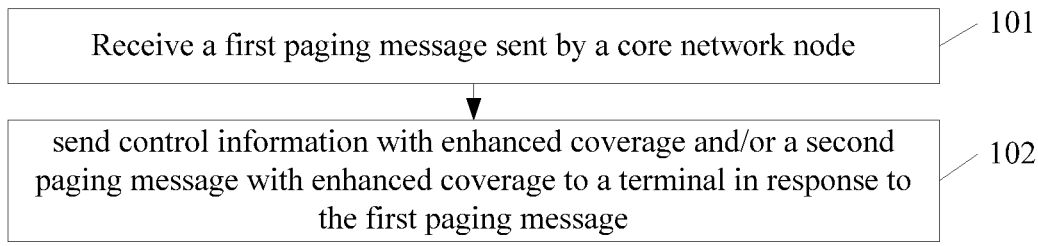
FIG. 1 is a flowchart of a paging optimization method according to an embodiment of the present invention.

An embodiment of the present invention provides a paging optimization method. As shown in FIG. 1, the method may include:

101. An access network node receives a first paging message sent by a core network node.

When a network needs to page a terminal, a core network node that serves the terminal may initiate a paging process to all access network nodes in a tracking area, so that an access network node can receive a first paging message sent by the core network node. The first paging message is used to page the terminal.

102. The access network node sends control information with enhanced coverage and/or a second paging message with enhanced coverage to a terminal in response to the first paging message.

The first paging message sent by the core network node to the access network node may carry a terminal identity index value of the terminal that needs to be paged and an international mobile subscriber identity (IMSI) of the terminal, or a terminal identity index value of the terminal that needs to be paged and a temporary mobile subscriber identity (S-temporary mobile subscriber identity, S-TMSI). In this case, to enable the terminal to normally receive, in a case in which a channel loss between the terminal and the access network node is severe, a paging message sent by a system, after receiving the first paging message sent by the core network code, the access network node may acquire a paging frame (PF) and/or a paging occasion (PO) according to the terminal identity index value carried in the first paging message, and send, over the paging frame and at the paging occasion, the control information with enhanced coverage and/or the second paging message with enhanced coverage to the terminal that needs to be paged.

It should be noted that, the control information with enhanced coverage and/or the second paging message with enhanced coverage are/is control information and/or a paging message that are/is sent by the access network node to a terminal when a channel loss between the terminal and the access network node is severe, and can enhance coverage of control information and/or a paging message in an existing system, so as to compensate for the severe channel loss between the terminal and the access network node and enable the terminal to normally receive a paging message sent by the system. A specific value of enhanced coverage that can be provided by the control information with enhanced coverage and/or the second paging message with enhanced coverage may be calculated according to a worst channel loss status between all terminals and the access network node, or different values of enhanced coverage may be calculated according to different channel loss statuses. The embodiment of the present invention does not limit a value of enhanced coverage, and a unit of the foregoing value of enhanced coverage may be dB.

According to the paging optimization method provided in the embodiment of the present invention, when a terminal needs to be paged, a core network node sends a first paging message to an access network node; after receiving the first paging message sent by the core network node, the access network node sends control information with enhanced coverage and/or a second paging message with enhanced coverage to the terminal that needs to be paged. This effectively ensures that, in a case in which a channel loss between the terminal and the access network node is severe, the terminal can still normally receive a paging message sent by a system.

Figure 2:
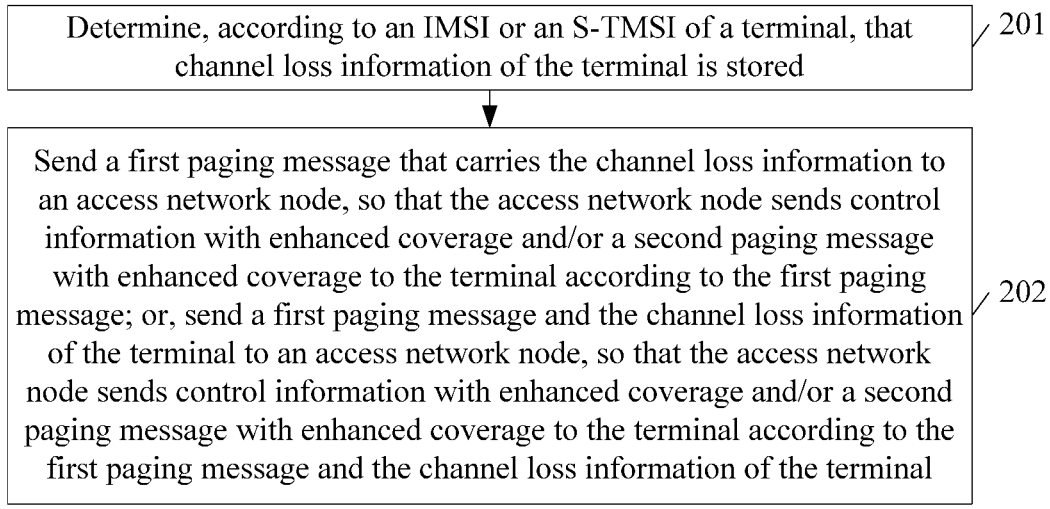
FIG. 2 is a flowchart of a paging optimization method according to another embodiment of the present invention.

Another embodiment of the present invention provides a paging optimization method. As shown in FIG. 2, the method may include:

201. Determine, according to an IMSI or an S-TMSI of a terminal, that channel loss information of the terminal is stored.

A core network node may determine, according to an IMSI or an S-TMSI of the terminal, whether the channel loss information of the terminal is stored, and when determining that the channel loss information of the terminal is stored, perform the following step 202. The channel loss information may be received and stored in advance by the core network node.

202. Send a first paging message that carries the channel loss information to an access network node, so that the access network node sends control information with enhanced coverage and/or a second paging message with enhanced coverage to the terminal according to the first paging message; or, send a first paging message and the channel loss information of the terminal to an access network node, so that the access network node sends control information with enhanced coverage and/or a second paging message with enhanced coverage to the terminal according to the first paging message and the channel loss information of the terminal.

After determining that the channel loss information of the terminal is stored, the core network node can send the first paging message that carries the channel loss information of the terminal to the access network node, so that the access network node sends the control information with enhanced coverage and/or the second paging message with enhanced coverage to the terminal according to the first paging message; or notify the access network node of the channel loss information by using a dedicated message at a protocol layer of the access network node and the core network node, and send the first paging message to the access network node in a form of sending a paging message, so that after receiving the channel loss information of the terminal and the first paging message, the access network node determines a transmission parameter, and sends, according to the transmission parameter, the control information with enhanced coverage and/or the second paging message with enhanced coverage to the terminal that needs to be paged.

According to the paging optimization method provided in the embodiment of the present invention, when a terminal needs to be paged, a core network node sends a first paging message to an access network node; after receiving the first paging message sent by the core network node, the access network node sends control information with enhanced coverage and/or a second paging message with enhanced coverage to the terminal that needs to be paged. This effectively ensures that, in a case in which a channel loss between the terminal and the access network node is severe, the terminal can still normally receive a paging message sent by a system.

Figure 3:
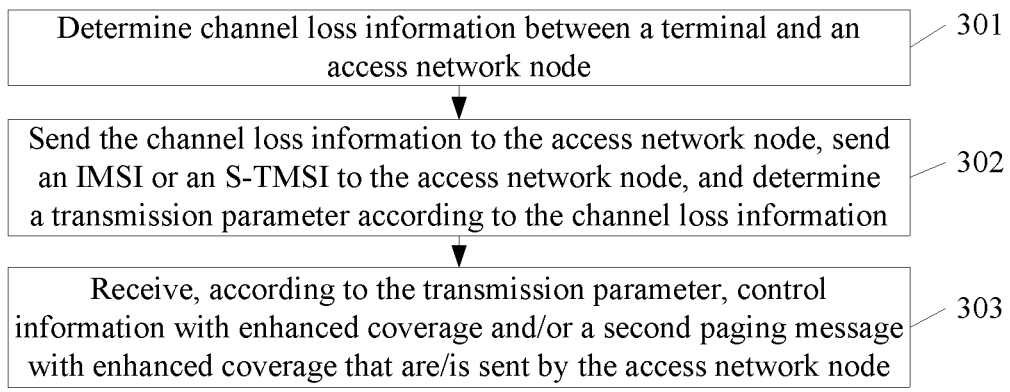
FIG. 3 is a flowchart of another paging optimization method according to another embodiment of the present invention.

Another embodiment of the present invention provides a paging optimization method. As shown in FIG. 3, the method may include:

301. A terminal determines channel loss information between the terminal and an access network node.

The channel loss information may include at least one of the following: reference signal received power (RSRP), reference signal received quality (RSRQ), a path loss, and a channel quality indication (CQI), where the path loss is a path loss between the terminal and an eNodeB. The channel loss information that is between the terminal and the access network node and determined by the terminal may be a value of a channel loss, or may be a range of a value of a channel loss, or may be a range index of a value of a channel loss. Specifically, the value of the channel loss may be obtained by using the following method: The terminal may perform measurement so as to obtain values of the RSRP, the RSRQ, and the CQI, and the value of the path loss may be obtained by the terminal by calculating a difference between power of a downlink cell-specific reference signal (CRS) sent by the eNodeB and the value of the RSRP, where the terminal can obtain, by using system information block type 2 (SIB2), the power used by the eNodeB to send the downlink CRS. The eNodeB, a system, or another network-side entity may divide the value of the channel loss between the terminal and the eNodeB into N ranges, where N is a positive integer; and then the eNodeB sends, to the terminal, division information that the value of the channel loss is divided into N ranges. By using one or more types of the following messages: a common radio resource control (RRC) message, a dedicated RRC message, a media access control (MAC) control element (CE) message, and a physical-layer message that are sent by the eNodeB and received by the terminal, the terminal can obtain the division information that the value of the channel loss is divided into N ranges. Specifically, the division information includes a parameter used to indicate a value of N and/or a threshold parameter used to determine N ranges, where the parameter used to indicate the value of N or the threshold parameter used to determine the N ranges may also be a fixed value that is agreed upon in advance and preset. The terminal, the eNodeB, or the another network-side entity may also perform index numbering on the N ranges in a manner that is agreed upon in advance, for example, a number ranges from range index 1 of a value of a channel loss to range index N of a value of a channel loss. For example, if the value of the channel loss is divided into three ranges, that is, N=3, the three ranges may be respectively as follows: range index 1 of a value of a channel loss: channel loss <=x1 dB; range index 2 of a value of a channel loss: x1 dB <channel loss <=x2 dB; and range index 3 of a value of a channel loss: channel loss >x2 dB. In this case, the parameter that indicates the value of N and is included in the division information that can be sent by the eNodeB to the terminal may be 3, and/or threshold parameters used to determine three ranges are x1 and x2; the foregoing parameters 3, x1, and x2 may also be preset, so that the eNodeB does not need to include these two parameters in the division information. Alternatively, the terminal may determine the N ranges of the value of the channel loss according to a rule that is agreed upon in advance with the eNodeB or the another network-side entity, and the rule that is agreed upon in advance may be a range index of a value of a channel loss, that is, x=fun(channel loss), where fun( ) indicates a function. Alternatively, the terminal may determine the N ranges of the value of the channel loss according to an agreement with the system, the eNodeB, or the another network-side entity. In this way, the terminal may determine a range of the value of the channel loss of the terminal according to the N ranges and the value of the channel loss of the terminal that is obtained through measurement, or may determine a range index of the value of the channel loss.

302. The terminal sends the channel loss information to the access network node, sends an IMSI or an S-TMSI to the access network node, and determines a transmission parameter according to the channel loss information.

When a channel loss between the terminal and the access network node is severe, the terminal may send the determined channel loss information of the terminal to the access network node, and send the IMSI or the S-TMSI of the terminal to the access network node, so that when the terminal needs to be paged, the access network node sends control information with enhanced coverage and/or a second paging message with enhanced coverage to the terminal. In addition, to ensure that the terminal can receive the control information with enhanced coverage and/or the second paging message with enhanced coverage that are/is sent by the access network node, the terminal needs to determine the transmission parameter according to the channel loss information. Specifically, same as the access network node, the terminal may determine the transmission parameter according to the channel loss information. For details, reference may be made to a description in step 406. Alternatively, before the terminal determines the transmission parameter according to the channel loss information, the access network node may determine a group of corresponding transmission parameters according to different channel loss information, and send the determined group of transmission parameters and a correspondence between the group of transmission parameters and the channel loss information to the terminal by using an RRC common message, so that the terminal can select a corresponding transmission parameter from the group of transmission parameters according to the channel loss information of the terminal.

303. Receive, according to the transmission parameter, control information with enhanced coverage and/or a second paging message with enhanced coverage that are/is sent by the access network node.

After determining the transmission parameter according to the channel loss information, the terminal may receive, according to the transmission parameter, the control information with enhanced coverage and/or the second paging message with enhanced coverage that are/is sent by the access network node.

According to the paging optimization method provided in the embodiment of the present invention, a terminal sends channel loss information to an access network node, and sends an IMSI or an S-TMSI to the access network node, so that when the terminal is being paged, the access network node can send control information with enhanced coverage and/or a second paging message with enhanced coverage to the terminal, and the terminal can receive, according to a transmission parameter that is determined according to the channel loss information, the control information with enhanced coverage and/or the second paging message with enhanced coverage that are/is sent by the access network node. This effectively ensures that, in a case in which a channel loss between the terminal and the access network node is severe, the terminal can still normally receive a paging message sent by a network-side device.

Figure 4:
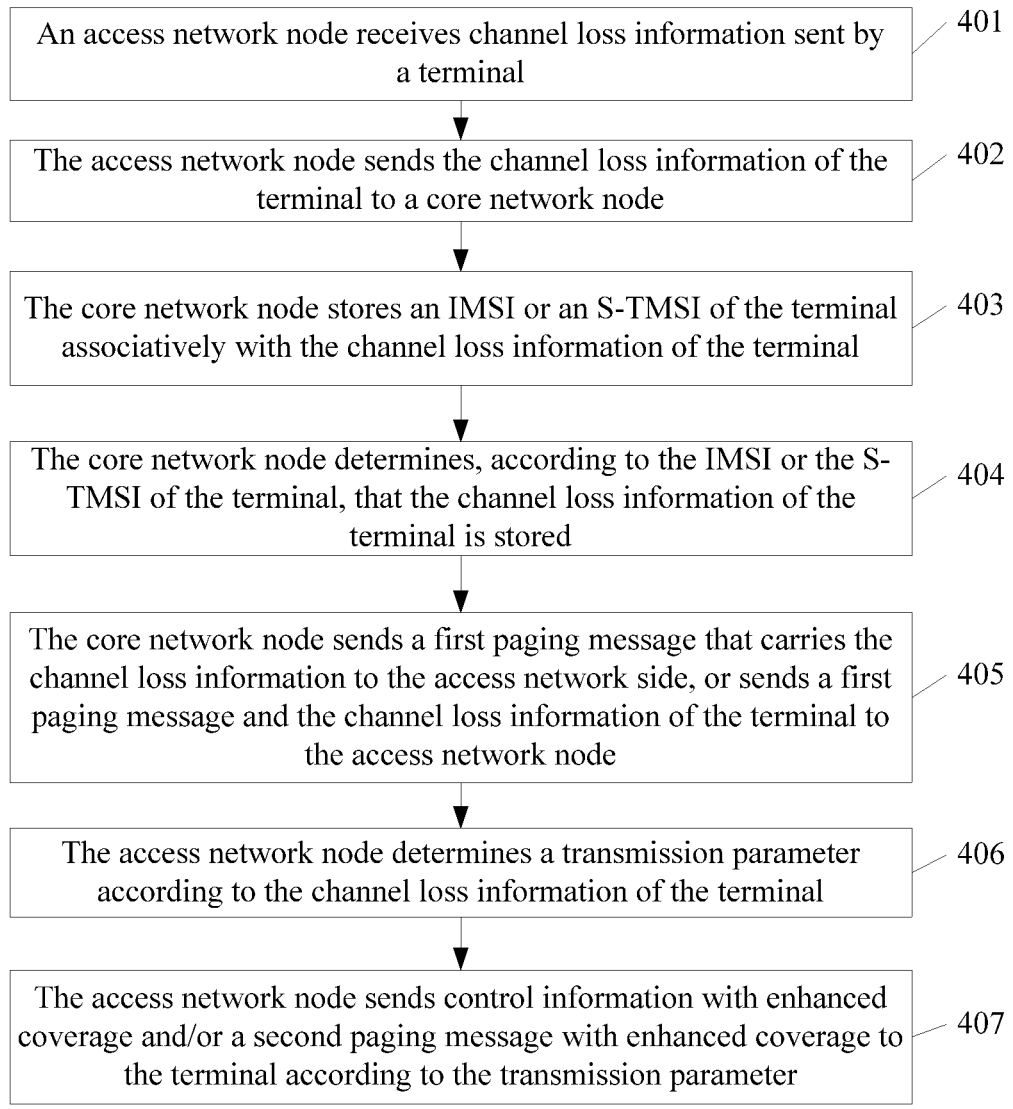
FIG. 4 is a flowchart of another paging optimization method according to another embodiment of the present invention.

Another embodiment of the present invention provides a paging optimization method. As shown in FIG. 4, the method may include:

401. An access network node receives channel loss information sent by a terminal.

For a terminal in an idle state, when the terminal has a service, or for a terminal in an idle state and a terminal in a connected state, when a system message needs to be changed or an earthquake or tsunami early warning or commercial mobile alert service is required, a network needs to page a corresponding UE. To ensure that in a case in which a channel loss between the terminal and an eNodeB is severe, the terminal can still normally receive control information of a paging message and/or a paging message that are/is sent by a system, the system needs to enhance coverage of the control information of a paging message and/or the paging message. Neither an MME nor the eNodeB knows a channel loss situation between the terminal and the eNodeB, so that neither the MME nor the eNodeB can determine to enhance coverage of control information of a paging message and/or a paging message for which terminal, or know a specific value of enhanced coverage that is required to enable the terminal to normally receive the control information of a paging message and/or the paging message; therefore, the embodiment of the present invention provides a solution: Control information with enhanced coverage and/or a second paging message with enhanced coverage are/is sent to all terminals, and a specific value of enhanced coverage that can be provided is determined according to a worst channel loss status. In another aspect, the embodiment of the present invention further provides another solution: Different specific values of enhanced coverage are calculated according to different channel loss statuses, so that a terminal needs to report channel loss information between the terminal and an eNodeB to a network device.

The eNodeB receives the channel loss information sent by the terminal. Specifically, the channel loss may include at least one of the following: RSRP, RSRQ, a path loss, and a CQI, where the path loss is a path loss between the terminal and the eNodeB. In addition, the channel loss information that is sent by the terminal and received by the eNodeB may be a value of the channel loss, or may be a range of a value of the channel loss, or may be a range index of a value of the channel loss. For a detailed description about acquiring a value of a channel loss by the terminal, reference may be made to a corresponding description in step 301 in the embodiment of the present invention, and details are not described herein again in this embodiment of the present invention. In addition, after acquiring the value of the channel loss, the range of the value of the channel loss, or the range index of the value of the channel loss between the terminal and the eNodeB, the terminal can send the obtained value of the channel loss, range of the value of the channel loss, or range index of the value of the channel loss to the eNodeB by using a non-access stratum (NAS) message, where the NAS message is transparent to the eNodeB. In this case, the eNodeB can receive the channel loss information that is sent by the terminal by using the NAS message, but does not parse the NAS message, where the NAS message may be dedicated, or may be a message in an attach process, a message in a tracking area update (TAU) process, or a message in another process. The terminal may also send the obtained value of the channel loss, range of the value of the channel loss, or range index of the value of the channel loss to the eNodeB by using one or more types of the following messages: an RRC message, a MAC CE message, and a physical-layer message, so that the eNodeB can receive the channel loss information sent by the terminal, where the RRC message may be an RRC connection request message (RRC connection request), and the physical-layer message may be a random access preamble.

Optionally, before sending the channel loss information of the terminal to the eNodeB, the terminal may first determine whether the value of the channel loss between the terminal and the eNodeB is greater than or equal to a set threshold; and reports the channel loss information of the terminal to the eNodeB when the value of the channel loss is greater than or equal to the set threshold, or does not report the channel loss information of the terminal to the eNodeB when the value of the channel loss is less than the set threshold.

402. The access network node sends the channel loss information of the terminal to a core network node.

After receiving the channel loss information of the terminal that is sent by the terminal by using an NAS message, the eNodeB may only extract the NAS message from an RRC layer without processing content of the NAS message, and perform protocol conversion; then the eNodeB sends the received channel loss information of the terminal to the MME by using a message at a protocol layer of the eNodeB and the MME. Alternatively, after receiving the channel loss information of the terminal that is sent by the terminal by using one or more types of the following messages: an RRC message, a MAC CE message, and a physical-layer message, the eNodeB may send the channel loss information to the MME by using a message at a protocol layer of the eNodeB and the MME. The message at the protocol layer of the eNodeB and the MME may be a capacity information indication.

403. The core network node stores an IMSI or an S-TMSI of the terminal associatively with the channel loss information of the terminal.

The foregoing core network node may be an MME.

After receiving the IMSI of the terminal and the channel loss information of the terminal that are sent by the eNodeB, the MME may store the IMSI of the terminal associatively with the channel loss information of the terminal. In the prior art, the core network node may allocate an S-TMSI to the terminal, so that in the embodiment of the present invention, after receiving the channel loss information of the terminal that is sent by the eNodeB, the MME may store the S-TMSI of the terminal associatively with the channel loss information of the terminal. For example, the MME may store the IMSI or the S-TMSI of the terminal associatively with the channel loss information of the terminal in a manner shown in Table 1, where, for example, the channel loss information is a range index of a value of a channel loss.

TABLE 1

| Range index of a value of a channel loss | Terminal identifier |
|---|---|
| 1 | IMSI 1 or S-TMSI 1 |

TABLE 1-continued

| Range index of a value of a channel loss | Terminal identifier |
|---|---|
| 2 | IMSI 2 or S-TMSI 2 |
| 3 | IMSI 3 or S-TMSI 3 |

It should be noted that, in the embodiment of the present invention, the IMSI or the S-TMSI of the terminal and the channel loss information of the terminal may be associatively stored specifically as shown in Table 1, or the associative storage may be implemented in another manner and format, which is not limited in the embodiment of the present invention.

404. The core network node determines, according to an IMSI or an S-TMSI of the terminal, that the channel loss information of the terminal is stored.

The MME may determine, according to an IMSI or an S-TMSI of the terminal, whether channel loss information that is of the terminal and corresponding to the IMSI or the S-TMSI of the terminal is stored, and when determining that the channel loss information of the terminal is available, perform the following step 405 to step 407. Specifically, the MME may perform determining according to the associative storage between the IMSI or the S-TMSI of the terminal and the channel loss information of the terminal.

Optionally, after determining that the channel loss information of the terminal is stored, the core network node may further send the IMSI or the S-TMSI of the terminal and the channel loss information of the terminal to the access network node by using one or more messages at a protocol layer of the access network node and the core network node, so that the access network node stores the IMSI or the S-TMSI of the terminal associatively with the channel loss information of the terminal. In this way, when the terminal is being paged, the core network node sends a first paging message to the access network node in a form of sending a paging message. The access network node parses the first paging message to obtain the IMSI or the S-TMSI of the paged terminal carried in the first paging message; obtains the channel loss information according to the IMSI or the S-TMSI from an association relationship that is between the IMSI or the S-TMSI of the terminal and the channel loss information of the terminal and stored in the access network node; determines a transmission parameter according to the channel loss information; and sends, according to the transmission parameter, control information with enhanced coverage and/or a second paging message with enhanced coverage to the terminal that needs to be paged by the core network node.

405. The core network node sends a first paging message that carries the channel loss information to the access network side, or sends a first paging message and the channel loss information of the terminal to the access network node.

If the MME determines that the channel loss information of the terminal is available, the MME may send the first paging message to all eNodeBs in a tracking area of the MME, where the first paging message may carry at least one piece of the following information: channel loss information corresponding to the IMSI or the S-TMSI of the terminal that needs to be paged, an identity index value of the terminal, and the IMSI or the S-TMSI of the terminal. For example, information elements (IE) included in the first paging message that carries the channel loss information, the identity index value of the terminal, and the IMSI or the S-TMSI of the terminal may be shown in Table 2, where the last IE is the channel loss information. The MME may also separately send the channel loss information of the terminal that needs to be paged and the first paging message to the eNodeB, where the channel loss information of the terminal can be notified to the eNodeB by using a dedicated message at the protocol layer of the eNodeB and the MME. If the MME determines that the channel loss information of the terminal is unavailable, when the terminal is being paged, the MME only needs to send the first paging message to the eNodeB according to the prior art.

TABLE 2

IE/Group name Group Name
Message type Message Type
UE Identity index value UE Identity Index value
UE paging identity UE Paging Identity
Paging discontinuous reception Paging DRX
Core network domain CN Domain
List of tracking area identities List of TAIs
>Tracking area identity list item TAI List Item
>>Tracking area identity TAI
Closed subscriber group identity list CSG Id List
>Closed subscriber group identity CSG Id
Paging priority Paging Priority
Channel loss information Channel loss Info It should be noted that a form of notifying, by the core network node, the access network node of the channel loss information of the terminal that needs to be paged is not limited in the embodiment of the present invention.

406. The access network node determines a transmission parameter according to the channel loss information of the terminal.

After receiving the first paging message that carries the channel loss information of the terminal or receiving the channel loss information of the terminal, the eNodeB may determine the transmission parameter according to the received channel loss information of the terminal, where the transmission parameter may be one or more of the following: a start frame number, a start subframe number, a start timeslot number, a start symbol number that are used for transmission of the control information with enhanced coverage and/or the second paging message with enhanced coverage, a number of the first resource block (RB), a number of the first subcarrier occupied for transmission of the control information with enhanced coverage and/or the second paging message with enhanced coverage, a quantity of frames, a quantity of subframes, a quantity of timeslots, a quantity of symbols, a quantity of RBs, a quantity of subcarriers that are occupied for transmission of the control information with enhanced coverage and/or the second paging message with enhanced coverage, a quantity of repeated times, a spreading factor, a spread spectrum sequence index, a size of transmission time interval bundling (TTI) bundling, an aggregation level that are used for transmission of the control information with enhanced coverage and/or the second paging message with enhanced coverage, power configuration, a modulation and coding scheme, a cycle, a PF, and a PO that are used for transmission of the control information with enhanced coverage and/or the second paging message with enhanced coverage.

Optionally, the access network node may determine the transmission parameter according to Transmission parameter=fun(channel loss information), where fun( ) indicates a fixed function.

Optionally, the access network node may store a correspondence relationship between the transmission parameter and the channel loss information. After receiving the first paging message that carries the channel loss information of the terminal or receiving the channel loss information of the terminal, the access network node may search the stored correspondence relationship to determine the transmission parameter. For example, when the channel loss information is a range index of a value of the channel loss, and the transmission parameter is the quantity of repeated times used by the control information with enhanced coverage or the quantity of repeated times used by the second paging message with enhanced coverage, the correspondence relationship between the channel loss information and the transmission parameter which is pre-stored in the access network node may be shown in Table 3. After receiving the first paging message that carries the range index of the value of the channel loss of the terminal or receiving the range index of the value of the channel loss of the terminal, the access network node may search Table 3 according to the received range index of the value of the channel loss of the terminal, so as to determine the quantity of repeated times.

TABLE 3

| Range index of a value of a channel loss | Quantity of repeated times of control information with enhanced coverage | Quantity of repeated times of a second paging message with enhanced coverage |
| --- | --- | --- |
| 1 | x1 | y1 |
| 2 | x2 | y2 |
| 3 | x3 | y3 |

407. The access network node sends control information with enhanced coverage and/or a second paging message with enhanced coverage to the terminal according to the transmission parameter.

The first paging message carries a terminal identity index value. After determining the transmission parameter, the eNodeB may send the control information with enhanced coverage and/or the second paging message with enhanced coverage to the terminal according to the transmission parameter and the terminal identity index value, where the second paging message carries the IMSI or the S-TMSI of the terminal.

Compared with control information without enhanced coverage, the control information with enhanced coverage meets at least one of the following conditions: more time domain resources are occupied for transmission of the control information with enhanced coverage compared with transmission of the control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission. Compared with a second paging message without enhanced coverage, the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission. Therefore, when a channel loss between the terminal and the access network node is relatively severe, a manner of sending the control information with enhanced coverage and/or the second paging message with enhanced coverage to the terminal may be used to ensure that the terminal successfully receives a paging message from a system.

Optionally, in a possible implementation manner, the eNodeB sends control information of the second paging message with enhanced coverage according to the terminal identity index value and the transmission parameter. For example, the control information of the second paging message with enhanced coverage is carried through a physical downlink control channel (PDCCH) and/or an enhanced physical downlink control channel (ePDCCH), and cyclic redundancy check (CRC) of the control information is scrambled by using a paging-radio network temporary identifier (P-RNTI); and a corresponding second paging message with enhanced coverage is scheduled by using the control message, so as to send the second paging message with enhanced coverage through a physical downlink shared channel (PDSCH) according to transmission parameter. In this way, the terminal may listen on the PDCCH and/or the ePDCCH channel according to the IMSI of the terminal and the transmission parameter that is determined according to the channel loss information of the terminal; descramble CRC of the PDCCH and/or the ePDCCH by using the P-RNTI; and check the control information with enhanced coverage by using the CRC, so as to determine whether the control information with enhanced coverage of the terminal is available. If the control information with enhanced coverage of the terminal is available, the terminal reads a corresponding second paging message with enhanced coverage according to the scheduling of the control information and the transmission parameter, and determines, according to an IMSI or an S-TMSI of a terminal that is carried in the second paging message with enhanced coverage, whether the second paging message is a paging message for the terminal itself. If the first paging message received by the eNodeB does not carry the channel loss information of the terminal, or only the first paging message sent by the MME is received, but the channel loss information of the terminal is not received, the eNodeB sends the control information of the second paging message and the second paging message to the terminal according to the prior art. In this case, the terminal only needs to calculate a corresponding PF and PO according to the IMSI of the terminal, and receive, over the PF and at the PO, the control information of the second paging message and the second paging message.

According to the paging optimization method provided in the embodiment of the present invention, when a terminal needs to be paged, a core network node sends a first paging message to an access network node; after receiving the first paging message sent by the core network node, the access network node sends control information with enhanced coverage and/or a second paging message with enhanced coverage to the terminal that needs to be paged. This effectively ensures that, in a case in which a channel loss between the terminal and the access network node is severe, the terminal can still normally receive a paging message sent by a system.

The terminal may report in advance channel loss information between the terminal and the access network node to the system, so that the system can acquire a transmission parameter of the terminal according to the channel loss information of the terminal, and then send the control information with enhanced coverage and/or a paging message with enhanced coverage according to the transmission parameter of the terminal, which saves network resources.

Figure 5:
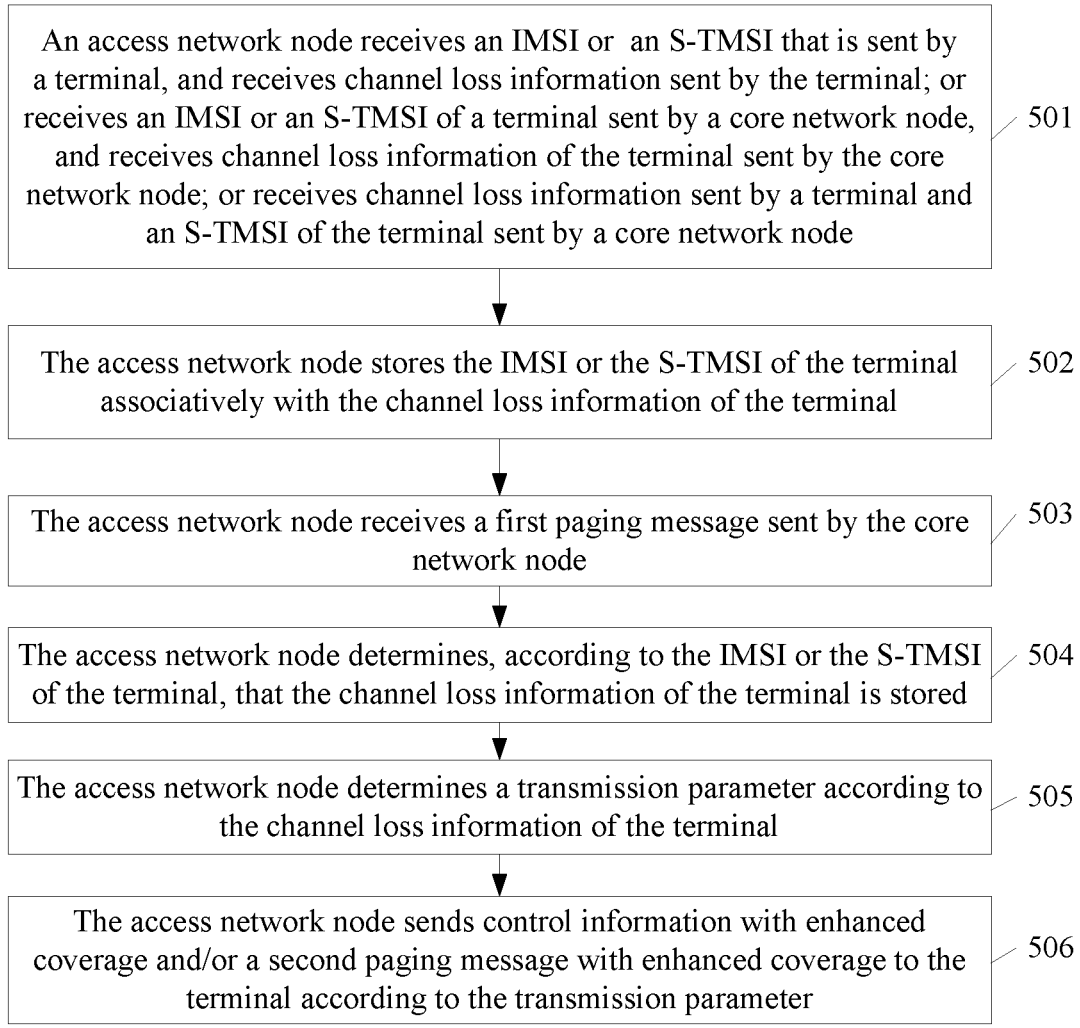
FIG. 5 is a flowchart of another paging optimization method according to another embodiment of the present invention.

Another embodiment of the present invention provides a paging optimization method. As shown in FIG. 5, the method may include:

501. An access network node receives an IMSI or an S-TMSI that is sent by a terminal, and receives channel loss information sent by the terminal; or receives an IMSI or an S-TMSI of a terminal sent by a core network node, and receives channel loss information of the terminal sent by the core network node; or receives channel loss information sent by a terminal and an S-TMSI of the terminal sent by a core network node.

The foregoing access network node may be a base station and further may be an eNodeB.

To ensure that, in a case in which a channel loss between the terminal and the eNodeB is severe, the terminal can still normally receive a paging message sent by a system, and that the eNodeB can send different control information with enhanced coverage and/or different second paging messages with enhanced coverage according to different channel losses between the terminal and the eNodeB, the terminal may report the channel loss information between the terminal and the eNodeB to the eNodeB, so that the eNodeB can obtain a channel loss status between the terminal and the eNodeB. Specifically, the terminal may send the channel loss information to the eNodeB by using one or more types of the following messages: an RRC message, a MAC CE message, and a physical-layer message, where the RRC message may be an RRC connection request message (RRC connection request), and the physical-layer message may be a random access preamble. The terminal may send, to the eNodeB by using an access stratum (AS) message, the IMSI of the terminal or the S-TMSI allocated to the terminal by the core network node, where the access stratum message may be an RRC Connection Request. In this case, the eNodeB can receive the IMSI or the S-TMSI sent by the terminal and the channel loss information sent by the terminal.

Optionally, before sending the IMSI or the S-TMSI of the terminal to the eNodeB, the terminal may first determine whether a value of the channel loss between the terminal and the eNodeB is greater than or equal to a set threshold; and reports the channel loss information of the terminal and the IMSI or the S-TMSI of the terminal to the eNodeB when the value of the channel loss is greater than or equal to the set threshold, or does not report the channel loss information of the terminal to the eNodeB when the value of the channel loss is less than the set threshold. In a case in which the value of the channel loss is equal to the set threshold, whether to report the channel loss information may be determined according to an actual network condition, which is not limited in the embodiment of the present invention.

Optionally, the terminal may send the channel loss information to the eNodeB in the foregoing manner; and the core network node may allocate the S-TMSI to the terminal, and send the allocated S-TMSI to the eNodeB by using a message at a protocol layer of an MME and the eNodeB. In this case, the eNodeB can receive the channel loss information sent by the terminal and the S-TMSI of the terminal sent by the MME.

Optionally, the embodiment of the present invention may further include step 401 to step 404. Further, if the MME determines that the channel loss information of the terminal is stored, the MME may send the IMSI or the S-TMSI of the terminal and the channel loss information of the terminal to the eNodeB by using a message at the protocol layer of the MME and the eNodeB. In this case, the eNodeB can receive the IMSI or the S-TMSI of the terminal and the channel loss information of the terminal that are sent by the MME.

502. The access network node stores the IMSI or the S-TMSI of the terminal associatively with the channel loss information of the terminal.

After the eNodeB receives the IMSI or the S-TMSI sent by the terminal and the channel loss information sent by the terminal, or after the eNodeB receives the IMSI or the S-TMSI of the terminal sent by the MME and the channel loss information of the terminal sent by the MME, or after the eNodeB receives the channel loss information sent by the terminal and the S-TMSI of the terminal sent by the MME, the eNodeB may store the received IMSI or S-TMSI of the terminal associatively with the channel loss information of the terminal. For a specific storage format, reference may be made to the manner in which the MME stores the IMSI or the S-TMSI of the terminal and the channel loss information of the terminal in step 403, and details are not described herein again in the embodiment of the present invention.

503. The access network node receives a first paging message sent by the core network node.

When the system needs to page the terminal, the MME that serves the terminal may send the first paging message to all eNodeBs in a tracking area.

504. The access network node determines, according to an IMSI or an S-TMSI of the terminal, that the channel loss information of the terminal is stored.

After the eNodeB receives the first paging message sent by the MME, the access network node may determine, according to an IMSI or an S-TMSI of the terminal carried in the first paging message, whether the channel loss information corresponding to the IMSI or the S-TMSI of the terminal is stored; and after determining that the channel loss information of the terminal is stored, perform the following step 505 to step 506.

505. The access network node determines a transmission parameter according to the channel loss information of the terminal.

When the eNodeB determines that the channel loss information corresponding to the IMSI or the S-TMSI of the terminal carried in the first paging message, the eNodeB may determine the transmission parameter according to the channel loss information of the terminal.

506. The access network node sends control information with enhanced coverage and/or a second paging message with enhanced coverage to the terminal according to the transmission parameter.

The first paging message carries a terminal identity index value of the terminal that needs to be paged. In this case, after the eNodeB receives the first paging message sent by the MME, and after the eNodeB determines the transmission parameter according to the channel loss information of the terminal, the eNodeB may send the control information with enhanced coverage and/or the second paging message with enhanced coverage to the terminal according to the terminal identity index value, the transmission parameter, a paging frame, and a paging occasion. In this way, the terminal may receive the control information with enhanced coverage and/or the second paging message with enhanced coverage according to the transmission parameter that is determined according to the channel loss information of the terminal. If the eNodeB determines, after receiving the first paging message sent by the MME, that the channel loss information corresponding to the IMSI or the S-TMSI of the terminal carried in the first paging message is unavailable, the eNodeB may only send control information of the second paging message and/or the second paging message according to the prior art.

It should be noted that, for a specific description of a parameter in step 501 to step 506, reference may be made to the specific description about a corresponding parameter in step 401 to step 407, and details are not described herein again in the embodiment of the present invention.

According to the paging optimization method provided in the embodiment of the present invention, when a terminal needs to be paged, a core network node sends a first paging message to an access network node; after receiving the first paging message sent by the core network node, the access network node sends control information with enhanced coverage and/or a second paging message with enhanced coverage to the terminal that needs to be paged. This effectively ensures that, in a case in which a channel loss between the terminal and the access network node is severe, the terminal can still normally receive a paging message sent by a system.

In addition, the terminal may report in advance channel loss information between the terminal and the access network node to the system, so that the system can acquire a transmission parameter of the terminal according to the channel loss information of the terminal, and then send the control information with enhanced coverage and/or a paging message with enhanced coverage according to the transmission parameter of the terminal, which saves network resources.

Figure 6:
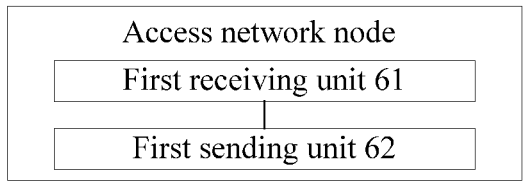
FIG. 6 is a schematic compositional diagram of an access network node according to another embodiment of the present invention.

Another embodiment of the present invention provides an access network node. As shown in FIG. 6, the access network node includes: a first receiving unit 61 and a first sending unit 62.

The first receiving unit 61 is configured to receive a first paging message sent by a core network node, where the first paging message is used to page a terminal.

The first sending unit 62 is configured to send control information with enhanced coverage and/or a second paging message with enhanced coverage to the terminal in response to the first paging message.

Further, the first paging message includes channel loss information of the terminal.

The access network node may further include: a second receiving unit 63.

The second receiving unit 63 is configured to, before the first sending unit 62 sends control information with enhanced coverage and/or a second paging message with enhanced coverage to the terminal in response to the first paging message, receive channel loss information of the terminal sent by the core network node.

Further, the access network node may further include: a third receiving unit 64 and a second sending unit 65.

The third receiving unit 64 is configured to, before the first receiving unit 61 receives the first paging message sent by the core network node, receive channel loss information sent by the terminal.

The second sending unit 65 is configured to send the channel loss information of the terminal received by the third receiving unit 64 to the core network node.

Further, the access network node may further include: a fourth receiving unit 66 and a storage unit 67.

The fourth receiving unit 66 is configured to receive an international mobile subscriber identity IMSI or a temporary mobile subscriber identity S-TMSI that is sent by the terminal, and receive channel loss information sent by the terminal; or, receive an IMSI or an S-TMSI of the terminal sent by the core network node, and receive channel loss information of the terminal sent by the core network node; or, receive channel loss information sent by the terminal and an S-TMSI of the terminal sent by the core network node.

The storage unit 67 is configured to store, associatively with the channel loss information of the terminal, the IMSI or the S-TMSI of the terminal received by the fourth receiving unit 66.

Further, the access network node may further include: a determining unit 68.

The determining unit 68 is configured to, before the first sending unit 62 sends control information with enhanced coverage and/or a second paging message with enhanced coverage to the terminal in response to the first paging message, determine, according to an IMSI or an S-TMSI of the terminal, that the channel loss information of the terminal is stored.

Further, the first sending unit 62 may include: a determining module 621 and a sending module 622.

The determining module 621 is configured to determine a transmission parameter according to the channel loss information of the terminal.

The sending module 622 is configured to send the control information with enhanced coverage and/or the second paging message with enhanced coverage to the terminal according to the transmission parameter determined by the determining module 621.

Further, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

Further, the transmission parameter includes at least one of the following: a start frame number, a start subframe number, a start timeslot number, a start symbol number, a number of the first resource block RB, a number of the first subcarrier, a quantity of frames, a quantity of subframes, a quantity of timeslots, a quantity of symbols, a quantity of RBs, a quantity of subcarriers, a quantity of repeated times, a spreading factor, a spread spectrum sequence index, a size of transmission time interval bundling TTI bundling, an aggregation level, power configuration, a modulation and coding scheme, a cycle, a paging frame PF, and a paging occasion PO that are used for transmission of the control information with enhanced coverage and/or the second paging message with enhanced coverage.

Further, the channel loss information includes a value of a channel loss, or a range of a value of a channel loss, or a range index of a value of a channel loss.

Further, the channel loss includes at least one of the following: reference signal received power RSRP, reference signal received quality RSRQ, a path loss, and a channel quality indication CQI.

For another function and structure of the access network node, reference may be made to the foregoing method embodiments.

According to the access network node provided in the embodiment of the present invention, when a terminal needs to be paged, a core network node sends a first paging message to the access network node; after receiving the first paging message sent by the core network node, the access network node sends control information with enhanced coverage and/or a second paging message with enhanced coverage to the terminal that needs to be paged. This effectively ensures that, in a case in which a channel loss between the terminal and the access network node is severe, the terminal can still normally receive a paging message sent by a system.

The terminal may report in advance channel loss information between the terminal and the access network node to the system, so that the system can acquire a transmission parameter of the terminal according to the channel loss information of the terminal, and then send the control information with enhanced coverage and/or a paging message with enhanced coverage according to the transmission parameter of the terminal, which saves network resources.

Figure 7:
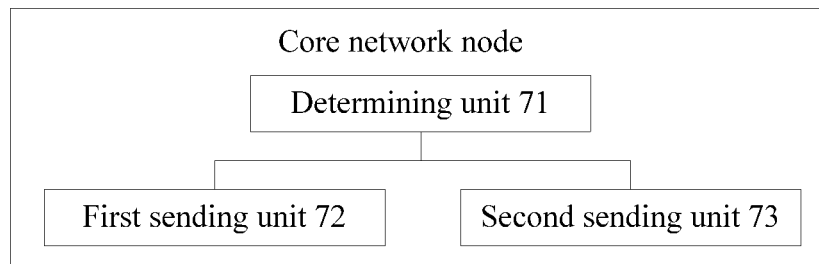
FIG. 7 is a schematic compositional diagram of a core network node according to another embodiment of the present invention.

Another embodiment of the present invention provides a core network node. As shown in FIG. 7, the core network node includes: a determining unit 71, and a first sending unit 72 or a second sending unit 73.

The determining unit 71 is configured to determine, according to an international mobile subscriber identity IMSI or a temporary mobile subscriber identity S-TMSI of a terminal, that channel loss information of the terminal is stored.

The first sending unit 72 is configured to send a first paging message that carries the channel loss information to an access network node, so that the access network node sends control information with enhanced coverage and/or a second paging message with enhanced coverage to the terminal according to the first paging message; or the second sending unit 73 is configured to send a first paging message and the channel loss information of the terminal to an access network node, so that the access network node sends control information with enhanced coverage and/or a second paging message with enhanced coverage to the terminal according to the first paging message and the channel loss information of the terminal.

Figure 8:
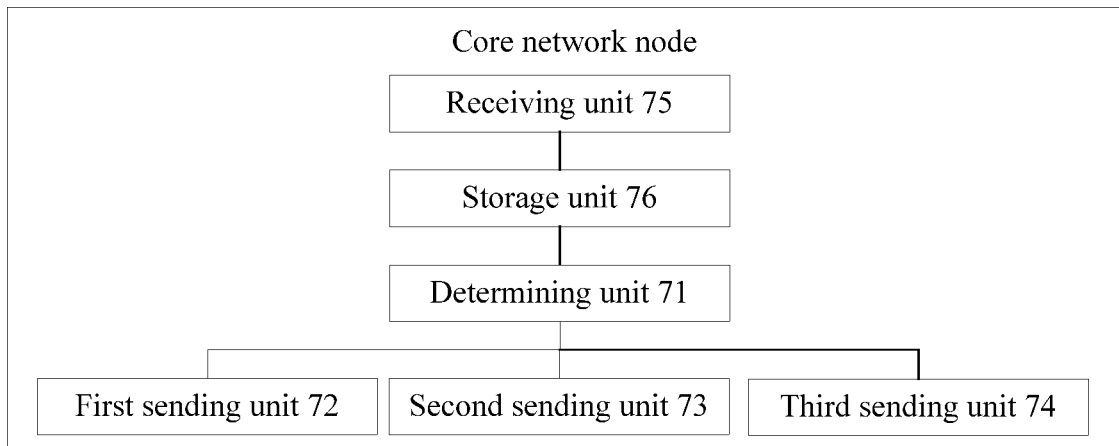
FIG. 8 is a schematic compositional diagram of another core network node according to another embodiment of the present invention.

Further, as shown in FIG. 8, the core network node may further include: a third sending unit 74.

The third sending unit 74 is configured to send the IMSI or the S-TMSI of the terminal to the access network node, and send the channel loss information of the terminal to the access network node, so that the access network device stores the IMSI or the S-TMSI of the terminal associatively with the channel loss information of the terminal.

Further, the core network node may further include: a receiving unit 75 and a storage unit 76.

The receiving unit 75 is configured to receive the channel loss information of the terminal before the determining unit 71 determines, according to the international mobile subscriber identity IMSI or the temporary mobile subscriber identity S-TMSI of the terminal, that the channel loss information of the terminal is stored.

The storage unit 76 is configured to store, associatively with the IMSI or the S-TMSI of the terminal, the channel loss information of the terminal received by the receiving unit 75.

Further, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

Further, the channel loss information includes a value of a channel loss, or a range of a value of a channel loss, or a range index of a value of a channel loss.

Further, the channel loss includes at least one of the following: reference signal received power RSRP, reference signal received quality RSRQ, a path loss, and a channel quality indication CQI.

According to the core network node provided in the embodiment of the present invention, when a terminal needs to be paged, the core network node sends a first paging message to an access network node; after receiving the first paging message sent by the core network node, the access network node sends control information with enhanced coverage and/or a second paging message with enhanced coverage to the terminal that needs to be paged. This effectively ensures that, in a case in which a channel loss between the terminal and the access network node is severe, the terminal can still normally receive a paging message sent by a system.

In addition, the terminal may report in advance channel loss information between the terminal and the access network node to the system, so that the system can acquire a transmission parameter of the terminal according to the channel loss information of the terminal, and then send the control information with enhanced coverage and/or a paging message with enhanced coverage according to the transmission parameter of the terminal, which saves network resources.

Figure 9:
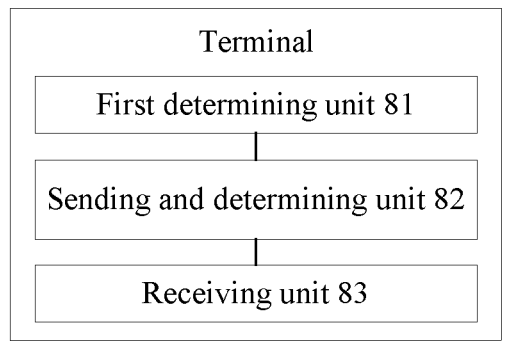
FIG. 9 is a schematic compositional diagram of a terminal according to another embodiment of the present invention.

Another embodiment of the present invention provides a terminal. As shown in FIG. 9, the terminal includes: a first determining unit 81, a sending and determining unit 82, and a receiving unit 83.

The first determining unit 81 is configured to determine channel loss information between the terminal and an access network node.

The sending and determining unit 82 is configured to send the channel loss information to the access network node, send an international mobile subscriber identity IMSI or a temporary mobile subscriber identity S-TMSI to the access network node, and determine a transmission parameter according to the channel loss information.

The receiving unit 83 is configured to receive, according to the transmission parameter determined by the sending and determining unit 82, control information with enhanced coverage and/or a second paging message with enhanced coverage that are/is sent by the access network node.

Further, the terminal may further include: a second determining unit 84.

The second determining unit 84 is configured to, before the sending and determining unit 82 sends the channel loss information to the access network node, sends the international mobile subscriber identity IMSI or the temporary mobile subscriber identity S-TMSI to the access network node, and determines the transmission parameter according to the channel loss information, determine that the channel loss information meets a set condition, where the set condition includes that a value of the channel loss is greater than or equal to a set threshold.

Further, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

Further, the transmission parameter includes at least one of the following: a start frame number, a start subframe number, a start timeslot number, a start symbol number, a number of the first resource block RB, a number of the first subcarrier, a quantity of frames, a quantity of subframes, a quantity of timeslots, a quantity of symbols, a quantity of RBs, a quantity of subcarriers, a quantity of repeated times, a spreading factor, a spread spectrum sequence index, a size of transmission time interval bundling TTI bundling, an aggregation level, power configuration, a modulation and coding scheme, a cycle, a paging frame PF, and a paging occasion PO that are used for transmission of the control information with enhanced coverage and/or the second paging message with enhanced coverage.

Further, the channel loss information includes the value of the channel loss, or a range of the value of the channel loss, or a range index of the value of the channel loss.

Further, the channel loss includes at least one of the following: reference signal received power RSRP, reference signal received quality RSRQ, a path loss, and a channel quality indication CQI.

According to the terminal provided in the embodiment of the present invention, the terminal sends channel loss information to an access network node, and sends an IMSI or an S-TMSI to the access network node, so that when the terminal is being paged, the access network node can send control information with enhanced coverage and/or a second paging message with enhanced coverage to the terminal, and the terminal can receive, according to a transmission parameter that is determined according to the channel loss information, the control information with enhanced coverage and/or the second paging message with enhanced coverage that are/is sent by the access network node. This effectively ensures that, in a case in which a channel loss between the terminal and the access network node is severe, the terminal can still normally receive a paging message sent by a system.

In addition, the terminal may report in advance the channel loss information between the terminal and the access network node to the system, so that the system can acquire the transmission parameter of the terminal according to the channel loss information of the terminal, and then send the control information with enhanced coverage and/or a paging message with enhanced coverage according to the transmission parameter of the terminal, which saves network resources.

Figure 10:
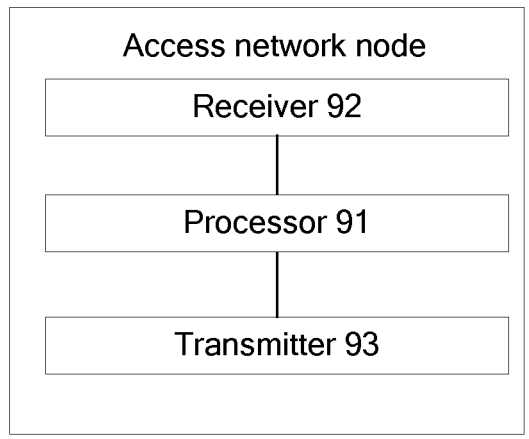
FIG. 10 is a schematic compositional diagram of another access network node according to another embodiment of the present invention.

Another embodiment of the present invention provides an access network node. As shown in FIG. 10, the access network node includes: at least one processor 91, a receiver 92, and a transmitter 93.

The receiver 92 is configured to receive a first paging message sent by a core network node, where the first paging message is used to page a terminal.

The processor 91 is configured to process the first paging message received by the receiver 92, and trigger the transmitter 93 to respond to the first paging message.

The transmitter 93 is configured to send control information with enhanced coverage and/or a second paging message with enhanced coverage to the terminal in response to the first paging message.

Further, the first paging message includes channel loss information of the terminal; or the receiver 92 is further configured to, before the transmitter sends control information with enhanced coverage and/or a second paging message with enhanced coverage to the terminal in response to the first paging message, receive channel loss information of the terminal sent by the core network node.

Further, the receiver 92 is further configured to, before receiving the first paging message sent by the core network node, receive channel loss information sent by the terminal.

The transmitter 93 is further configured to send the channel loss information of the terminal to the core network node.

Further, the access network node may further include: a memory 94.

The receiver 92 is further configured to receive an international mobile subscriber identity IMSI or a temporary mobile subscriber identity S-TMSI that is sent by the terminal, and receive channel loss information sent by the terminal; or, receive an IMSI or an S-TMSI of the terminal sent by the core network node, and receive channel loss information of the terminal sent by the core network node; or, receive channel loss information sent by the terminal and an S-TMSI of the terminal sent by the core network node.

The memory 94 is configured to store the IMSI or the S-TMSI of the terminal associatively with the channel loss information of the terminal.

Further, the processor 91 is further configured to, before processing the first paging message received by the receiver 92, and triggering the transmitter 93 to respond to the first paging message, determine, according to an IMSI or an S-TMSI of the terminal, that the channel loss information of the terminal is stored.

Further, the processor 91 is further configured to determine a transmission parameter according to the channel loss information of the terminal.

The transmitter 93 is further configured to send the control information with enhanced coverage and/or the second paging message with enhanced coverage to the terminal according to the transmission parameter.

Further, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

Further, the transmission parameter includes at least one of the following: a start frame number, a start subframe number, a start timeslot number, a start symbol number, a number of the first resource block RB, a number of the first subcarrier, a quantity of frames, a quantity of subframes, a quantity of timeslots, a quantity of symbols, a quantity of RBs, a quantity of subcarriers, a quantity of repeated times, a spreading factor, a spread spectrum sequence index, a size of transmission time interval bundling TTI bundling, an aggregation level, power configuration, a modulation and coding scheme, a cycle, a paging frame PF, and a paging occasion PO that are used for transmission of the control information with enhanced coverage and/or the second paging message with enhanced coverage.

Further, the channel loss information includes a value of a channel loss, or a range of a value of a channel loss, or a range index of a value of a channel loss.

Further, the channel loss includes at least one of the following: reference signal received power RSRP, reference signal received quality RSRQ, a path loss, and a channel quality indication CQI.

According to the access network node provided in the embodiment of the present invention, when a terminal needs to be paged, a core network node sends a first paging message to the access network node; after receiving the first paging message sent by the core network node, the access network node sends control information with enhanced coverage and/or a second paging message with enhanced coverage to the terminal that needs to be paged. This effectively ensures that, in a case in which a channel loss between the terminal and the access network node is severe, the terminal can still normally receive a paging message sent by a system.

In addition, the terminal may report in advance channel loss information between the terminal and the access network node to the system, so that the system can acquire a transmission parameter of the terminal according to the channel loss information of the terminal, and then send the control information with enhanced coverage and/or a paging message with enhanced coverage according to the transmission parameter of the terminal, which saves network resources.

Figure 11:
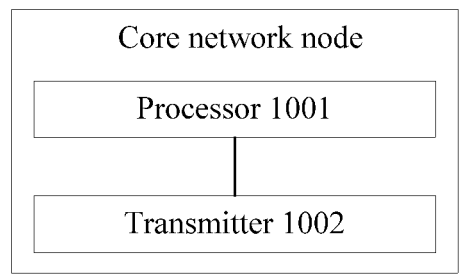
FIG. 11 is a schematic compositional diagram of another core network node according to another embodiment of the present invention.

Another embodiment of the present invention provides a core network node. As shown in FIG. 11, the core network node includes: at least one processor 1001 and a transmitter 1002.

The processor 1001 is configured to determine, according to an international mobile subscriber identity IMSI or a temporary mobile subscriber identity S-TMSI of a terminal, that channel loss information of the terminal is stored.

The transmitter 1002 is configured to send a first paging message that carries the channel loss information to an access network node, so that the access network node sends control information with enhanced coverage and/or a second paging message with enhanced coverage to the terminal according to the first paging message; or, the transmitter 1002 is further configured to send a first paging message and the channel loss information of the terminal to an access network node, so that the access network node sends control information with enhanced coverage and/or a second paging message with enhanced coverage to the terminal according to the first paging message and the channel loss information of the terminal.

Further, the transmitter 1002 is further configured to send the IMSI or the S-TMSI of the terminal to the access network node, and send the channel loss information of the terminal to the access network node, so that the access network node stores the IMSI or the S-TMSI of the terminal associatively with the channel loss information of the terminal.

Further, the core network node may further include: a receiver 1003 and a memory 1004.

The receiver 1003 is configured to, before the determining, according to an international mobile subscriber identity IMSI or a temporary mobile subscriber identity S-TMSI of a terminal, that channel loss information of the terminal is stored, receive the channel loss information of the terminal.

The memory 1004 is configured to store the channel loss information of the terminal associatively with the IMSI or the S-TMSI of the terminal.

Further, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

Further, the channel loss information includes a value of a channel loss, or a range of a value of a channel loss, or a range index of a value of a channel loss.

Further, the channel loss includes at least one of the following: reference signal received power RSRP, reference signal received quality RSRQ, a path loss, and a channel quality indication CQI.

According to the core network node provided in the embodiment of the present invention, when a terminal needs to be paged, the core network node sends a first paging message to an access network node; after receiving the first paging message sent by the core network node, the access network node sends control information with enhanced coverage and/or a second paging message with enhanced coverage to the terminal that needs to be paged. This effectively ensures that, in a case in which a channel loss between the terminal and the access network node is severe, the terminal can still normally receive a paging message sent by a system.

In addition, the terminal may report in advance channel loss information between the terminal and the access network node to the system, so that the system can acquire a transmission parameter of the terminal according to the channel loss information of the terminal, and then send the control information with enhanced coverage and/or a paging message with enhanced coverage according to the transmission parameter of the terminal, which saves network resources.

Figure 12:
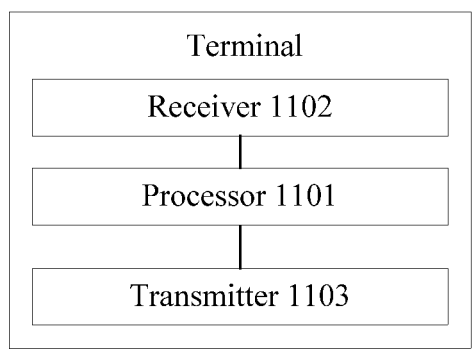
FIG. 12 is a schematic compositional diagram of another terminal according to another embodiment of the present invention.

Another embodiment of the present invention provides a terminal. As shown in FIG. 12, the terminal includes: at least one processor 1101, a receiver 1102, and a transmitter 1103.

The processor 1101 is configured to determine channel loss information between the terminal and an access network node.

The processor 1101 is further configured to trigger the transmitter 1103 to: send the channel loss information to the access network node, and send an international mobile subscriber identity IMSI or a temporary mobile subscriber identity S-TMSI to the access network node; and is further configured to determine a transmission parameter according to the channel loss information.

The receiver 1102 is configured to receive, according to the transmission parameter, control information with enhanced coverage and/or a second paging message with enhanced coverage that are/is sent by the access network node.

Further, the processor 1101 is further configured to, before the sending the channel loss information to the access network node, and sending an international mobile subscriber identity IMSI or a temporary mobile subscriber identity S-TMSI to the access network node, determine that the channel loss information meets a set condition, where the set condition includes that a value of the channel loss is greater than or equal to a set threshold.

Further, the control information with enhanced coverage meets at least one of the following conditions: more time domain resources are occupied for transmission of the control information with enhanced coverage compared with transmission of control information without enhanced coverage, more frequency resources are occupied for transmission of the control information with enhanced coverage compared with transmission of the control information without enhanced coverage, transmit power for transmission of the control information with enhanced coverage is higher than transmit power for transmission of the control information without enhanced coverage, a modulation scheme used for transmission of the control information with enhanced coverage is more robust than a modulation scheme used for transmission of the control information without enhanced coverage, a coding mode used for transmission of the control information with enhanced coverage is more robust than a coding mode used for transmission of the control information without enhanced coverage, and bits of the control information with enhanced coverage in a transmission are fewer than bits of the control information without enhanced coverage in a transmission; and the second paging message with enhanced coverage meets at least one of the following conditions: more time domain resources are occupied for transmission of the second paging message with enhanced coverage compared with transmission of a second paging message without enhanced coverage, more frequency resources are occupied for transmission of the second paging message with enhanced coverage compared with transmission of the second paging message without enhanced coverage, transmit power for transmission of the second paging message with enhanced coverage is higher than transmit power for transmission of the second paging message without enhanced coverage, a modulation scheme used for transmission of the second paging message with enhanced coverage is more robust than a modulation scheme used for transmission of the second paging message without enhanced coverage, a coding mode used for transmission of the second paging message with enhanced coverage is more robust than a coding mode used for transmission of the second paging message without enhanced coverage, and bits of the second paging message with enhanced coverage in a transmission are fewer than bits of the second paging message without enhanced coverage in a transmission.

Further, the transmission parameter includes at least one of the following: a start frame number, a start subframe number, a start timeslot number, a start symbol number, a number of the first resource block RB, a number of the first subcarrier, a quantity of frames, a quantity of subframes, a quantity of timeslots, a quantity of symbols, a quantity of RBs, a quantity of subcarriers, a quantity of repeated times, a spreading factor, a spread spectrum sequence index, a size of transmission time interval bundling TTI bundling, an aggregation level, power configuration, a modulation and coding scheme, a cycle, a paging frame PF, and a paging occasion PO that are used for transmission of the control information with enhanced coverage and/or the second paging message with enhanced coverage.

Further, the channel loss information includes the value of the channel loss, or a range of the value of the channel loss, or a range index of the value of the channel loss.

Further, the channel loss includes at least one of the following: reference signal received power RSRP, reference signal received quality RSRQ, a path loss, and a channel quality indication CQI.

According to the terminal provided in the embodiment of the present invention, the terminal sends channel loss information to an access network node, and sends an IMSI or an S-TMSI to the access network node, so that when the terminal is being paged, the access network node can send control information with enhanced coverage and/or a second paging message with enhanced coverage to the terminal, and the terminal can receive, according to a transmission parameter that is determined according to the channel loss information, the control information with enhanced coverage and/or the second paging message with enhanced coverage that are/is sent by the access network node. This effectively ensures that, in a case in which a channel loss between the terminal and the access network node is severe, the terminal can still normally receive a paging message sent by a system.

In addition, the terminal may report in advance the channel loss information between the terminal and the access network node to the system, so that the system can acquire the transmission parameter of the terminal according to the channel loss information of the terminal, and then send the control information with enhanced coverage and/or a paging message with enhanced coverage according to the transmission parameter of the terminal, which saves network resources.

Figure 13:
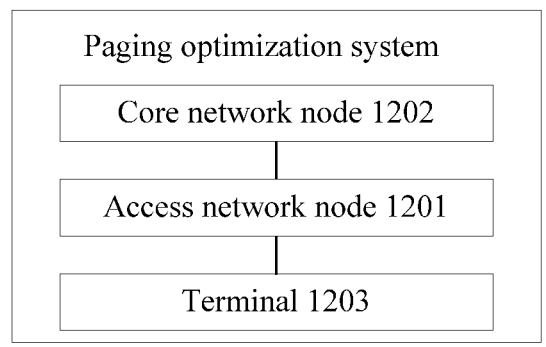
FIG. 13 is a schematic compositional diagram of a paging optimization system according to another embodiment of the present invention.

Another embodiment of the present invention provides a paging optimization system. As shown in FIG. 13, the paging optimization system includes: an access network node 1201, a core network node 1202, and a terminal 1203.

The access network node 1201 is configured to receive a first paging message sent by the core network node 1202, where the first paging message is used to page the terminal 1203; and send control information with enhanced coverage and/or a second paging message with enhanced coverage to the terminal 1203 in response to the first paging message.

The core network node 1202 is configured to determine, according to an international mobile subscriber identity IMSI or a temporary mobile subscriber identity S-TMSI of the terminal 1203, that channel loss information of the terminal 1203 is stored; and send the first paging message that carries the channel loss information to the access network node 1201, so that the access network node 1201 sends the control information with enhanced coverage and/or the second paging message with enhanced coverage to the terminal 1203 according to the first paging message; or, send the first paging message and the channel loss information of the terminal 1203 to the access network node 1201, so that the access network node 1201 sends the control information with enhanced coverage and/or the second paging message with enhanced coverage to the terminal 1203 according to the first paging message and the channel loss information of the terminal 1203.

The terminal 1203 is configured to send the channel loss information to the access network node 1201, and send the international mobile subscriber identity IMSI or the temporary mobile subscriber identity S-TMSI to the access network node 1201; determine a transmission parameter according to the channel loss information; and receive, according to the transmission parameter, the control information with enhanced coverage and/or the second paging message with enhanced coverage that are/is sent by the access network node 1201.

According to the paging optimization system provided in the embodiment of the present invention, when a terminal needs to be paged, a core network node sends a first paging message to an access network node; after receiving the first paging message sent by the core network node, the access network node sends control information with enhanced coverage and/or a second paging message with enhanced coverage to the terminal that needs to be paged. This effectively ensures that, in a case in which a channel loss between the terminal and the access network node is severe, the terminal can still normally receive a paging message sent by a system.

In addition, the terminal may report in advance channel loss information between the terminal and the access network node to the system, so that the system can acquire a transmission parameter of the terminal according to the channel loss information of the terminal, and then send the control information with enhanced coverage and/or a paging message with enhanced coverage according to the transmission parameter of the terminal, which saves network resources.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A paging method, comprising:
determining, by a core network node, channel loss information of a terminal according to an international mobile subscriber identity (IMSI) or a temporary mobile subscriber identity (S-TMSI) of the terminal;
sending, by the core network node, a first paging message that carries the channel loss information to an access network node, wherein the first paging message is used to page the terminal; and
in response to the first paging message, sending, by the access network node, control information with enhanced coverage to the terminal, the channel loss information is associated with a transmission parameter, and the transmission parameter comprises a quantity of repeated times used for transmission of the control information with enhanced coverage.

2. The method according to claim 1, wherein the transmission parameter is further used for transmission of a second paging message with enhanced coverage.

3. The method according to claim 1, wherein the transmission parameter comprises a quantity of repeated times used for transmission of a second paging message with enhanced coverage.

4. The method according to claim 1, further comprising:
receiving, by the core network node, the channel loss information of the terminal; and
storing, by the core network node, the channel loss information of the terminal.

5. The method according to claim 1, wherein
more time domain resources are occupied for transmission of the control information with enhanced coverage compared with transmission of control information without enhanced coverage, or bits of the control information with enhanced coverage in a transmission are fewer than bits of the control information without enhanced coverage in a transmission.

6. The method according to claim 1, wherein the channel loss information comprises a range index of a value of a channel loss.

7. The method according to claim 1, wherein the channel loss comprises a channel quality indication.

8. The method according to claim 2, wherein the channel loss information is a range index of a value of a channel loss, and the transmission parameter is a quantity of repeated times for transmission of the control information with enhanced coverage.

9. The method according to claim 1, wherein the control information with enhanced coverage is used to schedule a second paging message with enhanced coverage.

10. The method according to 1, the method further comprising:
receiving, by the access network node, the channel loss information from the terminal; and
sending, by the access network node, the channel loss information of the terminal to the core network node.

11. The method according to claim 1, wherein
more time domain resources are occupied for transmission of the second paging message with enhanced coverage compared with transmission of a second paging message without enhanced coverage, or bits of the second paging message with enhanced coverage in a transmission are fewer than bits of the second paging message without enhanced coverage in a transmission.

12. An apparatus, comprising:
a memory storing program instructions; and
a processor coupled to the memory, wherein the program instructions, when executed by the processor, cause the apparatus to:
determine channel loss information of a terminal according to an international mobile subscriber identity (IMSI) or a temporary mobile subscriber identity (S-TMSI) of the terminal; and
send a first paging message that carries the channel loss information to an access network node, wherein the first paging message is used to page the terminal, the channel loss information is associated with a transmission parameter, and the transmission parameter comprises a quantity of repeated times used for transmission of control information with enhanced coverage.

13. The apparatus according to claim 12, wherein the transmission parameter is further used for transmission of a second paging message with enhanced coverage.

14. The apparatus according to claim 12, wherein the transmission parameter comprises a quantity of repeated times used for transmission of a second paging message with enhanced coverage.

15. The apparatus according to claim 12, wherein the program instructions, when executed by the processor, further cause the apparatus to:
receive the channel loss information of the terminal; and
store the channel loss information of the terminal.

16. The apparatus according to claim 12, wherein the apparatus is a mobile management entity.

17. The apparatus according to claim 12, wherein the channel loss information is a range index of a value of a channel loss, and the transmission parameter is a quantity of repeated times used by the control information with enhanced coverage.

18. A communication system, comprising a core network node and an access network node, wherein:
the core network node is configured to determine channel loss information of a terminal according to an international mobile subscriber identity (IMSI) or a temporary mobile subscriber identity (S-TMSI) of the terminal, and send a first paging message that carries the channel loss information to an access network node, wherein the first paging message is used to page the terminal; and
the access network node is configured to, in response to the first paging message, send control information with enhanced coverage to the terminal, wherein the channel loss information is associated with a transmission parameter, and the transmission parameter comprises a quantity of repeated times used for transmission of the control information with enhanced coverage.

19. The system according to claim 18, wherein the control information with enhanced coverage is used to schedule a second paging message with enhanced coverage.

20. The meth system od according to 18, wherein the access network node is further configured to:
receive the channel loss information from the terminal; and
send the channel loss information of the terminal to the core network node.

* * * * *